United States Patent [19]

Suzuki

[11] Patent Number: 5,485,175
[45] Date of Patent: Jan. 16, 1996

[54] METHOD AND APPARATUS FOR CONTINUOUSLY DISPLAYING A HIERARCHICAL MENU WITH A PERMANENT STATIONING SETTING/CLEARING ICON

[75] Inventor: Yasuhiro Suzuki, Inagi, Japan

[73] Assignee: Fujitsu Limited, Kawasaki, Japan

[21] Appl. No.: 384,223

[22] Filed: Feb. 6, 1995

Related U.S. Application Data

[63] Continuation of Ser. No. 97,718, Jul. 27, 1993, abandoned, which is a continuation of Ser. No. 626,559, Dec. 12, 1990, abandoned.

[30] Foreign Application Priority Data

Dec. 12, 1989 [JP] Japan ................... 1-321772

[51] Int. Cl.⁶ .................................. G06F 3/00
[52] U.S. Cl. .................. 395/156; 395/159; 395/161
[58] Field of Search ................. 395/155–161, 395/700; 345/117–120, 146, 902

[56] References Cited

U.S. PATENT DOCUMENTS

| | | | |
|---|---|---|---|
| 4,546,435 | 10/1985 | Herbert et al. | 395/700 |
| 4,712,191 | 12/1987 | Penna | 395/156 X |
| 4,772,882 | 9/1988 | Mical | 395/156 X |
| 4,813,013 | 3/1989 | Dunn | 395/159 |
| 4,821,211 | 4/1989 | Torres | 395/156 |
| 4,885,694 | 12/1989 | Pray et al. | 395/156 X |
| 4,896,291 | 6/1990 | Gest et al. | 395/156 |
| 4,931,783 | 6/1990 | Atkinson | 395/156 |
| 4,974,174 | 11/1990 | Kleinman | 395/156 |
| 4,974,196 | 11/1990 | Iwami et al. | 395/157 |
| 5,065,347 | 11/1991 | Pajak et al. | 395/159 |
| 5,119,475 | 6/1992 | Smith et al. | 395/156 |
| 5,157,768 | 10/1992 | Hoeber et al. | 395/157 |
| 5,172,245 | 12/1992 | Kita et al. | 395/156 X |
| 5,230,063 | 7/1993 | Hoeber et al. | 395/156 |
| 5,243,697 | 9/1993 | Hoeber et al. | 395/156 |
| 5,263,174 | 11/1993 | Layman | 395/156 X |
| 5,276,795 | 1/1994 | Hoeber et al. | 395/156 |

OTHER PUBLICATIONS

Microsoft Paintbrush, Microsoft Corp, 1986, pp. 12–20, 25–32, 44, 47–54, 58–61, 67–68, 87–89.
Holtz, "Personal Designer", PC Mag, Aug. 1988, p. 178(4).
Callery et al, "Speaking of Graphics", At, May 1988, p. 111(4).
Nurrie, "Designs on Commodore", CAD–CAM International, Dec. 1987, Summary.
Advanced Interface Design Guide, IBM Corp., Jun. 1989, pp. 15–25, 55–58.
*Macintosh System Software User's Guide v.6.0*, Apple Computer, Inc., 1988, pp. 10–13.
*Hyper Card User's Guide,* Apple Computer, Inc., 1988, pp. 28–31, 118–119, 138–139.

*Primary Examiner*—Mark R. Powell
*Assistant Examiner*—John E. Breene
*Attorney, Agent, or Firm*—Staas & Halsey

[57] ABSTRACT

A method and apparatus of displaying a hierarchical menu for editor commands to be used with drawing software for processing objects in the drawing by displaying hierarchically structured command menus and executing a designated command. The command menus comprises at least a part of the command names belonging to the same hierarchy, a command name belonging to a senior hierarchy of the command, and the command menus are updated at each command selection for display. A permanent stationing setting/clearing icon is used for continuously displaying a selected command while successively performing the command on the objects in the drawing.

17 Claims, 33 Drawing Sheets

FIG. 16L

| | (VERB) | (OBJECT) | (COMPLEMENT) |
|---|---|---|---|
| 41-1 | TYPE (=1) | TYPE (=2) | TYPE (=3) |
| 41-2 | MENU ITEM NAME | MENU ITEM NAME | MENU ITEM |
| 41-3 | IMMEDIATELY PRIOR SELECTION ↑ | IMMEDIATELY PRIOR SELECTION | IMMEDIATELY PRIOR SELECTION } GENERALLY PADDING |
| 41-4 | SUBORDINATE JUNIOR ITEM | | |
| 41-5 | MEMBER NUMBER | GRAPHIC COMPONENT CLASS MASK BIT | |
| 41-6 | PADDING | | PADDING |

ICON TYPE

POP-UP MENU

METHOD AND APPARATUS FOR CONTINUOUSLY DISPLAYING A HIERARCHICAL MENU WITH A PERMANENT STATIONING SETTING/CLEARING ICON

This application is a continuation of application Ser. No. 08/097,718, filed Jul. 27, 1993, now abandoned, which is a continuation of application Ser. No. 07/626,559, filed Dec. 12, 1990, now abandoned.

BACKGROUND OF THE INVENTION

1. Technical Field of Invention

This invention pertains to a hierarchical type edit command menu displaying method used for executing a command selection using menus having a hierarchical structure.

In an edit mode of a work station having advanced man-machine interface functions, an operator selects a desired command from a displayed pop-up menu. In particular, edit commands used e.g. in a circuit designing CAD are classified in hierarchies such as those for edit functions or kinds of edit objects.

2. Description of the Related Art

FIG. 1 shows how menus are conventionally displayed. In FIG. 1, 2B indicates a display; 3A, 3B, 3C, . . . respectively indicate a primary hierarchy menu, a secondary hierarchy menu, a tertiary hierarchy menu, . . . ; 4 indicates an identical hierarchy command name displaying part; and 7-1 indicates a figure displaying window.

The case of FIG. 1 shows the following state in which: (i) command names A, B, C, . . . , Z exist on the primary hierarchy menu 3A; (ii) the command name D is pointed at on the primary hierarchy menu 3A; (iii) the secondary hierarchy menu 3B corresponding to the command name D is displayed; (iv) command names D1, D2, . . . , Dm exist on the secondary hierarchy menu (v) The tertiary hierarchy menu 3C corresponding to the command name D3 is displayed.

As is apparent from FIG. 1, if e.g. the command name D is pointed at, the corresponding junior ranked secondary hierarchy menu 3B is displayed at the corresponding position. The display positions are similar for other junior ranked hierarchies. The above has the advantage that the hierarchical relation is clearly understood.

However, this menu displaying method has the following disadvantages.

(1) Because menus are displayed parallelly in respective senior or junior hierarchies on the right as necessary, the space efficiency is low. (An edit object, such as a circuit diagram, displayed below is significantly concealed.) Besides, since the menus in respective hierarchies overlap with each other at the right margin of the screen, they are difficult to see, and operability is bad.

(2) The mouse movement distance is large, since the mouse operating method dictates that movement be performed by keeping the mouse button depressed and selection is performed at the position where the mouse button is not depressed. Minute maneuvering is especially difficult with the mouse button depressed. Therefore, it is impossible to perform interruptions, such as scrolling in the identical hierarchy of the menu itself during a command selection, scrolling on an edit object such as a circuit diagram, and additional selection of an edit object component. Also, since a pop-up type is premised, menus cannot be permanently stationed (and selection from an intermediate hierarchy is impossible).

For instance, at a hierarchical transition of the earlier described menus, (e.g. D of menu 3A→D3 of menu 3B→D31 of menu 3C,) after a positioning to a particular menu item line, the junior hierarchical menu is displayed by performing a mouse stroking to the outside of the right end of the menu region, i.e. by moving the mouse. In case of a movement to D of menu 3A, menu 3B is displayed. In case of a movement to D3 of menu 3B, menu 3C is displayed. (Refer to a stroke across each menu in FIG. 1.) These operations sequentially show the hierarchically structured menu.

During these operations, the operator needs to keep depressing the mouse button, because if the button is released during these operations, the menu item of the mouse cursor position at the released time is selected and finalized. As described earlier, the operator must keep depressing the button depressed to correctly trace the exact position in a vast menu region. In other words, the operator must perform two precise works at the same time, namely, "to keep the mouse button depressed and "to trace the exact position in the vast menu region". These operations are extremely difficult for the operator to perform.

These requirements are explained in more detail. Assume a menu in the most senior hierarchy is opened when the operator searches for the item to be selected from the list. At this time, although the operator wants to concentrate on "searching", he is forced to keep the mouse button depressed. When he finally finds the item's location, he has to move the mouse to the exact position of the item, and he also has to keep depressing the mouse button depressed during this movement. Once the mouse position is moved to the desired item by the mouse operations earlier described, its junior menus are newly displayed. The operator must keep repeating these operations, until he reaches the final desired item.

(3) Because all menu items in the identical hierarchy are always displayed, and since the edit object component such as a "noun to verb" type operation is selected in advance, the condensed display of only the menu items actually related (executable) cannot be performed, but can only be shown by changing the display luminance. Also, the selection instructions for junior or intermediate hierarchies are cumbersome, particularly when the selecting items are uniquely determined in the above operation.

For solving these points, this invention purports to improve the space efficiency for menu displaying and operability.

SUMMARY OF THE INVENTION

An object of the present invention is to improve the space efficiency for displayed menus and operability.

This invention pertains to a hierarchical type edit command menu displaying method used for executing a command selection using menus having a hierarchical structure.

Menus displayed in a particular hierarchy are each displayed with at least an identical hierarchy command name displaying part, a junior hierarchy branching mark displaying part, and a senior hierarchy command name displaying part. Namely, a displayed menu specifies its senior hierarchy command to which the menu being displayed belongs and whether or not any menu exists in a hierarchy junior to that to which the menu being displayed belongs.

BRIEF DESCRIPTION OF THE DRAWINGS

FIG. 16L comprises comparative tables showing the structures of a verb, an object and a complement;

DESCRIPTION OF THE PREFERRED EMBODIMENTS

Figure 1:
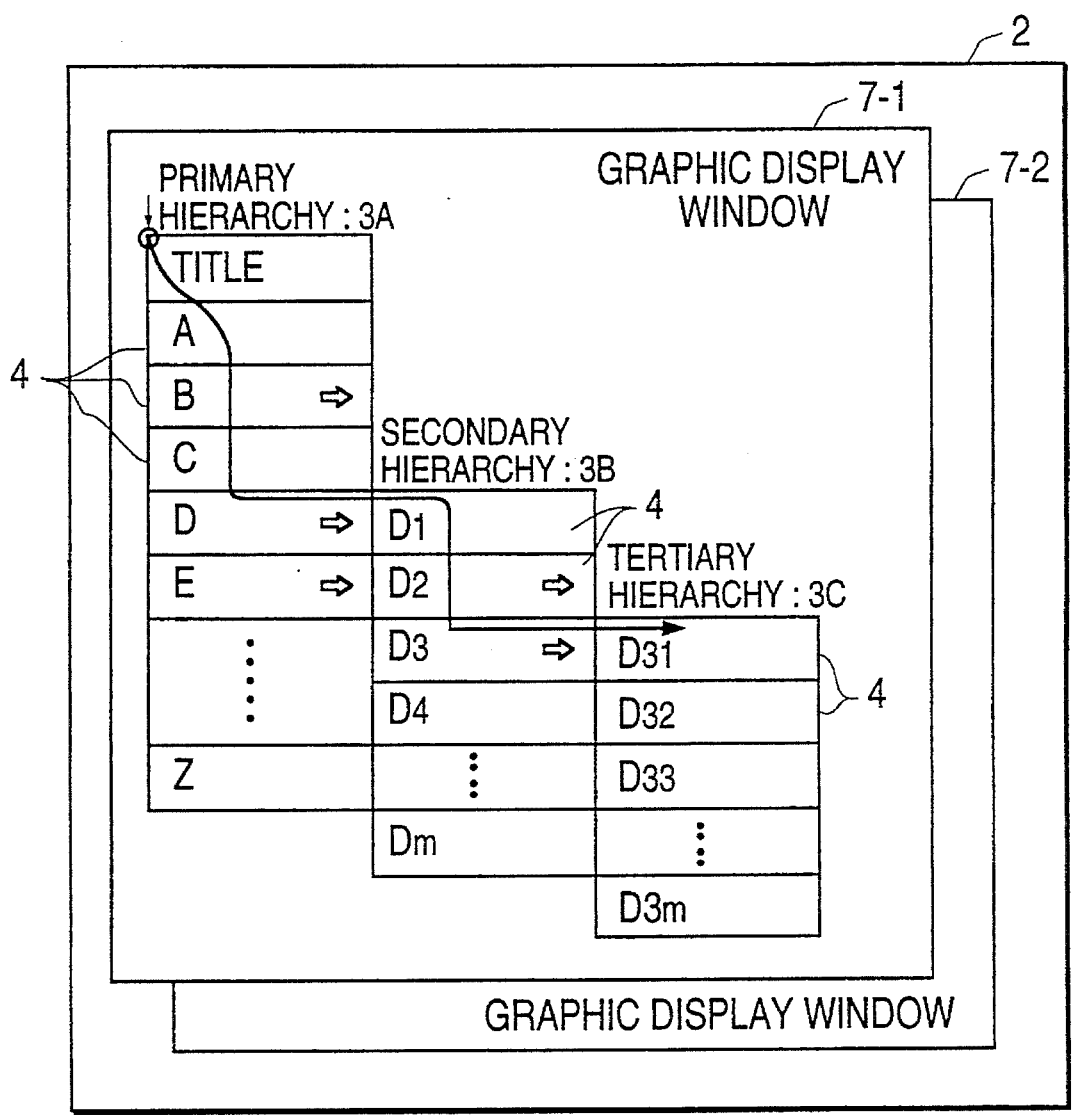
FIG. 1 shows a menu is conventionally displayed.
Figure 2A:
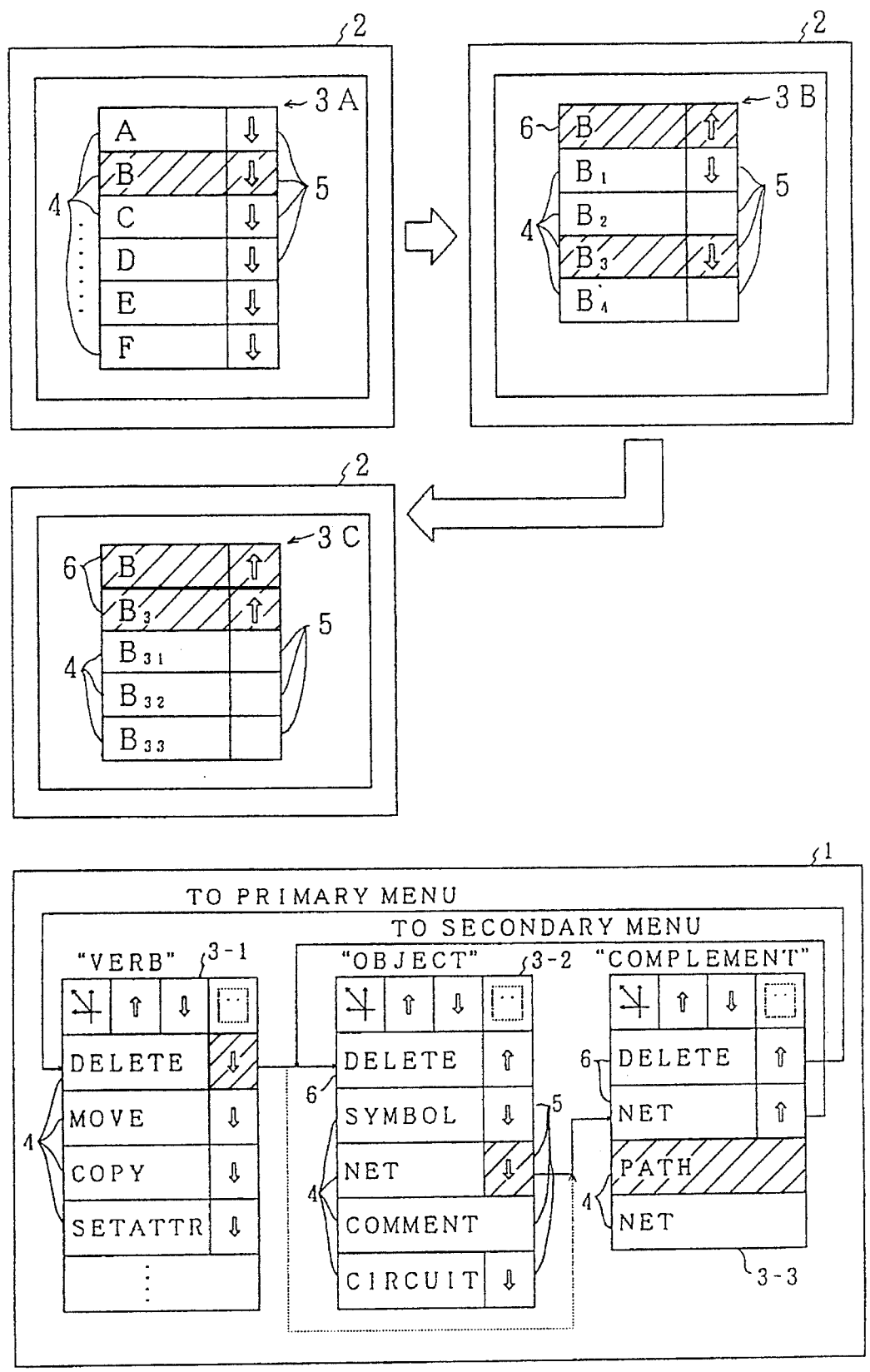
FIG. 2A explains the principle of this invention.

FIG. 2A explains the principle of this invention.

1 in FIG. 2A is a data processing part comprising menus structured in hierarchies. It executes a command selection contemporaneously with displaying the menus structured in hierarchies.

2 is a display. In FIG. 2A, a plurality of displays 2 show a state in which primary hierarchy menus, secondary hierarchy menus and tertiary hierarchy menus are sequentially displayed. Menu displays change on a single display.

3A is a primary hierarchy menu, 3B is a secondary hierarchy menu, 3C is a tertiary hierarchy menu, 3-1 is a verb menu and is a primary hierarchy menu, 3-2 is an object menu and is a secondary hierarchy menu, 3-3 is a complement menu and is a tertiary hierarchy menu.

4 is an identical hierarchy command name displaying part for displaying the command names belonging to an identical hierarchy.

5 is a junior hierarchy branching mark displaying part for displaying a junior hierarchy branching mark showing that a command belonging to a junior hierarchy exists in correspondence with an individual command name.

6 is a senior hierarchy command name displaying part for parallelly displaying command names belonging to a senior hierarchy when an individual menu is displayed as a result of a command name belonging to a senior hierarchy being pointed at.

Obviously, what is to be edited, such as a circuit diagram, is displayed on the display 2. An operator performs the process of inputting a command (instructing a command execution) by referring to a graphic on the display 2.

Now, assume initially that the primary hierarchy menu 3A is displayed on an appropriate position of the display 2 so that the operator can input a command. This status is assumed to be menu 3A shown on the left upper case in FIG. 2A. In this case, the identical hierarchy command name displaying part 4 parallelly shows that the command names A, B, C, . . . , F exist and belong to the identical hierarchy in the menu 3A. Correspondingly to the individual command names, it is made clear whether or not a hierarchy junior to its own hierarchy exists by displaying, e.g. a skeleton arrow pointing to the bottom in FIG. 2A, in the junior hierarchy branching mark displaying part 5. The menu size is of a predetermined size. Obviously, a scrolling is performed when all command names belonging to the identical hierarchy cannot be displayed simultaneously.

If the operator points the command name B under this status, contemporaneous with the execution of the corresponding command B3, the menu 3B such as that shown in the upper right case of FIG. 2A is displayed and the earlier menu 3A is deleted. Although not specifically shown in FIG. 2A, the display of the circuit diagram of the edit object is edited and changed in correspondence with the execution of command B. The menu 3B is a secondary hierarchy menu and command names B1, B2, . . . are parallelly shown on the identical hierarchy command name displaying part 4, and the junior branching mark displaying part 5 displays a skeleton arrow (a junior hierarchy branching mark) pointing to the bottom of FIG. 2A. Also a senior hierarchy command name displaying part 6 is provided for specifying the senior hierarchy command corresponding to whose execution the menu 3B itself has come to be displayed. Then, in the senior hierarchy command name displaying part 6, the command name B of the corresponding senior hierarchy is displayed. For showing that the command corresponding to the name is senior to the name itself, a skeleton arrow pointing to the top (hereinafter called a senior hierarchy branching mark) is displayed, for example. The resulting menu display after the operator points the command name B3 under this display mode is shown in the lower left case of FIG. 2A. That is, the tertiary hierarchy menu 3C is displayed. In this case the primary command name B and the secondary command name B3 are displayed in the senior hierarchy command name displaying part 6.

In performing the above display, connections are made among menus in respective hierarchies in the data processing part 1 in the following manner. The case of FIG. 2A shows that the primary hierarchy menu 3A corresponds to the verb menu 3-1, the secondary hierarchy menu 3B corresponds to the object menu 3-2 and the tertiary hierarchy menu 3C corresponds to the complement menu 3-3. In the case of FIG. 2A, a command "delete" is pointed at in the verb menu 3-1, a command "net" (a signal line) is pointed at in the object menu 3-2, and as a result a command PATH (a path unit; line set to branch) is pointed at in the complement menu 3-3. The solid line arrow in FIG. 2A indicates a chain controlling respective displayed menus in the data processing part 1.

The case of the above described solid line chain being extended indicates that a command selection is performed by a "verb to noun" type operation described later. However, when a command selection is performed by a "noun to verb" type operation, described later, by pointing the entirety or a part of the diagram of the processing object on the screen of the display 2 by a separate means, the processing object (the object pointed by the object menu 3-2) is specified. Thence, the object menu 3-1 shown in FIG. 2A is displayed, and the command "delete" is pointed. As a result, the deleting process is performed for the processing object pointed at earlier. Then, the complement menu 3-1 is immediately displayed by omitting the procedure of displaying the object menu 3-2 as shown by the dotted lines in FIG. 2A. In this case, too, "net" which is the above stated processing object is described in the senior hierarchy command name displaying part 6 on the complement menu 3-3. That is, the verb menu 3-1, the object menu 3-2 and the complement menu 3-3 are connected by a chain in the data processing part 1.

Figure 2B:
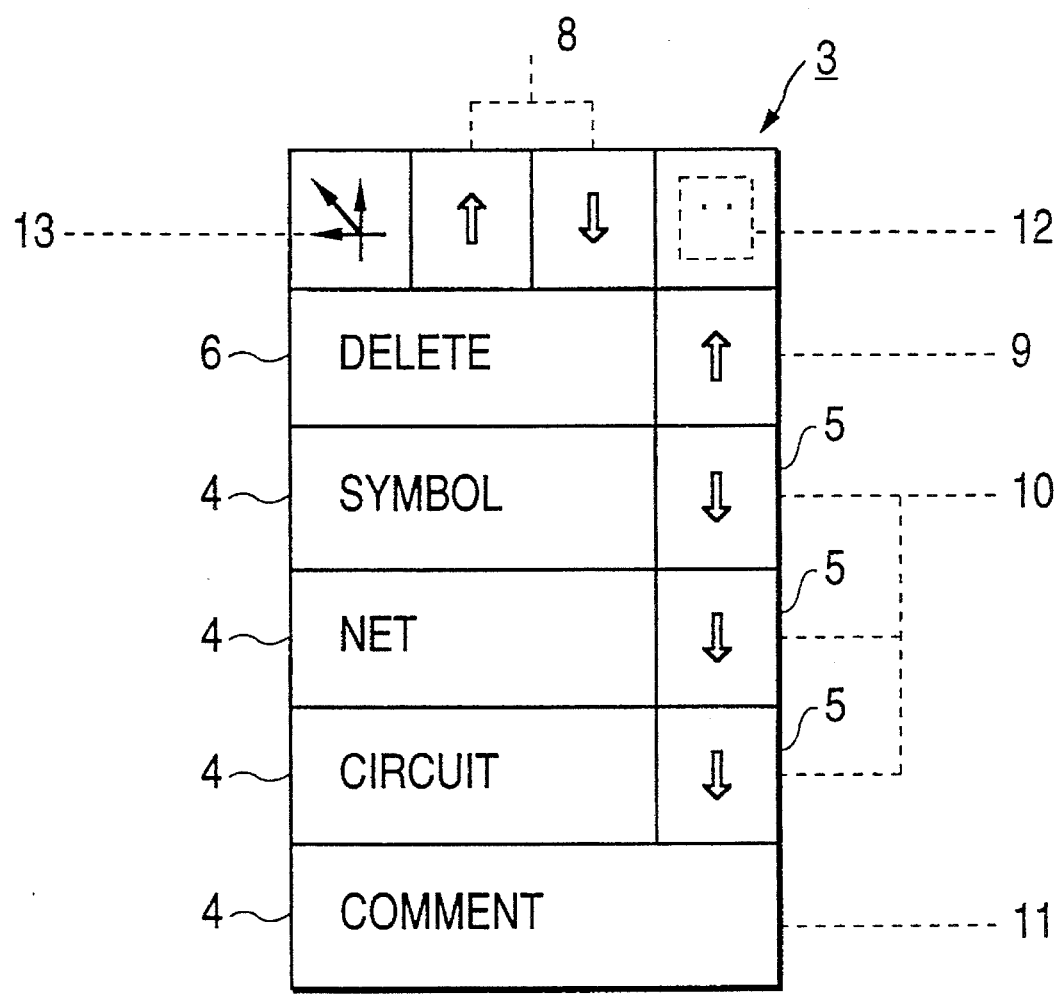
FIG. 2B shows an embodiment of displaying menus used in this invention.

FIG. 2B shows an embodiment for displaying menus used in this invention. The parts with numbers 3, 4 and 5 in FIG. 2B correspond to the parts with the same numbers in FIG. 2A. Numbers 8 through 13 shown in FIG. 2B indicate the following items.

8 is a scrolling icon:

When there are too many command lines, this icon is used for scrolling the lines upward and downward. During this scrolling operation, only the command lines in the identical hierarchy change. The senior branching is always fixed and is not scrolled.

9 is a senior branching line:

This menu indicates a secondary menu corresponding to the "delete" command for deleting a circuit diagram component. The secondary menu shows a section of an "object" which becomes the object of deletion. The senior branching line gives an instruction when an original secondary menu is sought after a transition is once made to a secondary menu. That is, this menu is for reversing the menu hierarchy and stacking the current menu selection status so that the selection status and the hierarchical position are confirmed. The branching mark of an upward skeleton arrow and the "delete" column of the menu item name are the same in whichever directions the arrows point.

10 is a junior branching line:

This line has the branching mark of a downward skeleton arrow, which means that it has a junior hierarchy from which a further selection is made. It must be noted that this line makes a transition to a tertiary menu which represents a "complement" of the junior hierarchy, even though it is the same whether the senior branching line 9 points to the branching mark of an upward skeleton arrow or to the menu item name "delete". When the column of a menu item name (e.g. "symbol") is specified, this line immediately executes a command, similarly to a terminating line 11. The junior hierarchy in this case follows the content selected immediately before.

11 is a terminating line:

When this line, without any branching mark of either an upward or downward skeleton arrow, is selected, it immediately executes a command and indicates a menu item without any further junior branching. This example shows that a "comment graphic" is selected as an object of deletion. Since there is no logical relation for a "comment graphic" there is no "deletion format" that becomes a "complement".

12 is a permanent stationing setting/clearing icon:

This specifies the menu permanently stationed in the displaying part.

13 is a menu position moving icon:

When a permanently stationed menu is moved, after being specified, this icon designates the position to which the menu is moved.

Figure 3:
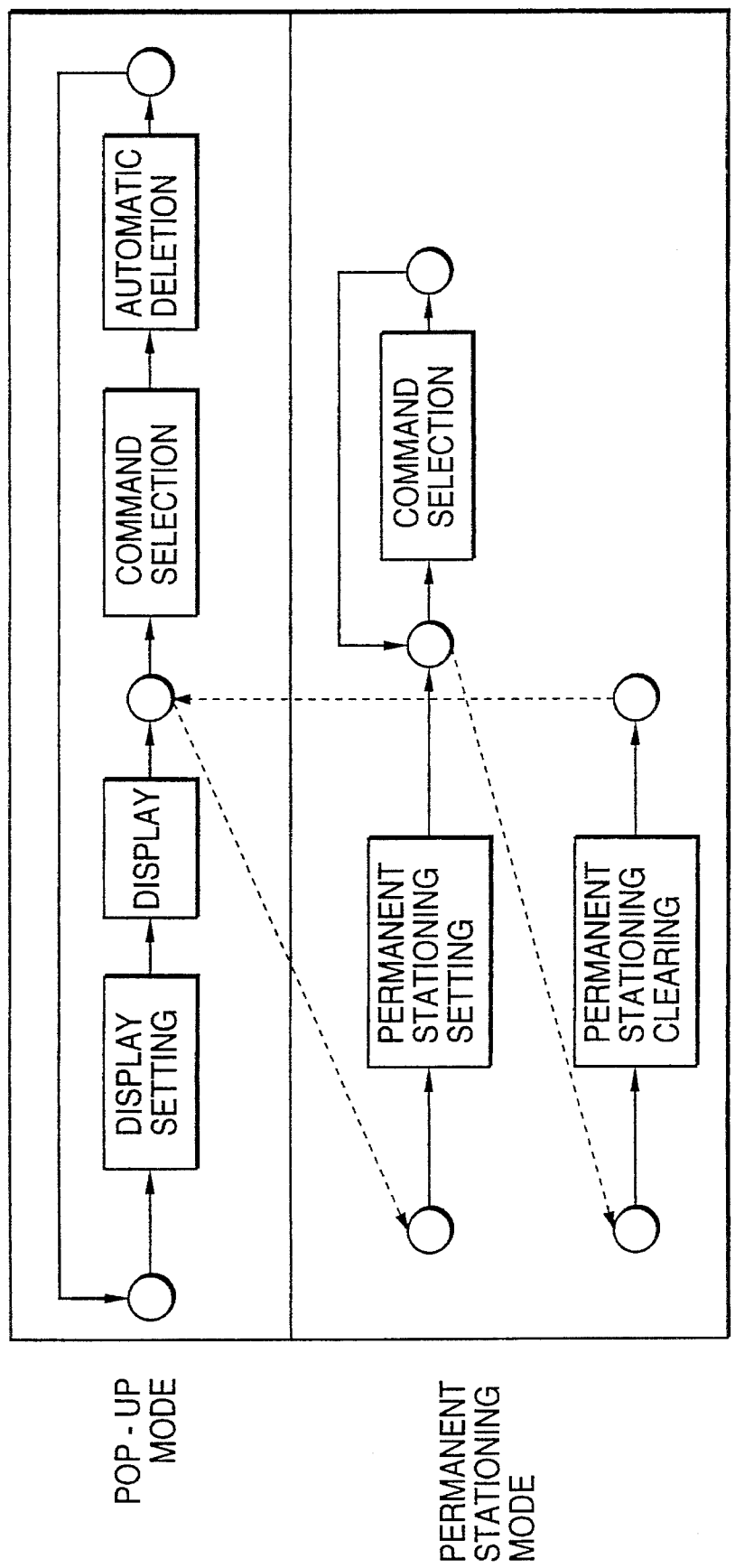
FIG. 3 explains the mode of displaying menus in this invention.

FIG. 3 is a diagram that explains the mode for displaying the menu in this invention.

In the pop-up mode, when a "display setting" is executed, the corresponding "display" is performed. When a "command selection" is made, the currently displayed menu is "automatically deleted". When a junior hierarchy menu exists, a "display setting" is completed.

The permanent stationing mode is transferred by operating the permanent stationing setting/clearing icon under the condition in which a "display" is performed in the pop-up mode. After the "permanent stationing" is performed, and if the "command selection" is made, the displayed menu is no longer automatically deleted, and the next command selection is enabled. It goes without saying that "permanent stationing clearing" can be done too.

Incidentally, in most edit operations emphasizing the revision of the processing object graphic, a pop-up display of a command menu of a "noun to verb" type is appropriate from the standpoint of a timely command selection at any place and economical use of the screen area. However, in some cases a continuous processing for components that become a plurality of objects of the same "verb" in a "verb to noun" type, such as repeating large scale deletions or copies by utilizing the initial input or the completed circuit diagram, is appropriate. Also, when a transfer to another command "verb" is desired in such a continuous processing form, it is cumbersome to perform a click operation such as one from "command completion" to "menu displaying". Hence, a "permanent stationing mode" is provided as well as an ordinary "pop-up mode".

FIGS. 4 through 8 show processing examples for "noun to verb" type operations. In those drawings, numbers 2, 3, 7-1, 13, 14 and 15 respectively indicate a display, a menu, a graphic displaying window, a symbol, a net, and a path.

FIGS. 4 through 8 also correspond to the status in which a "delete" command is for deleting a net. Their operations are as follows.

Figure 4:
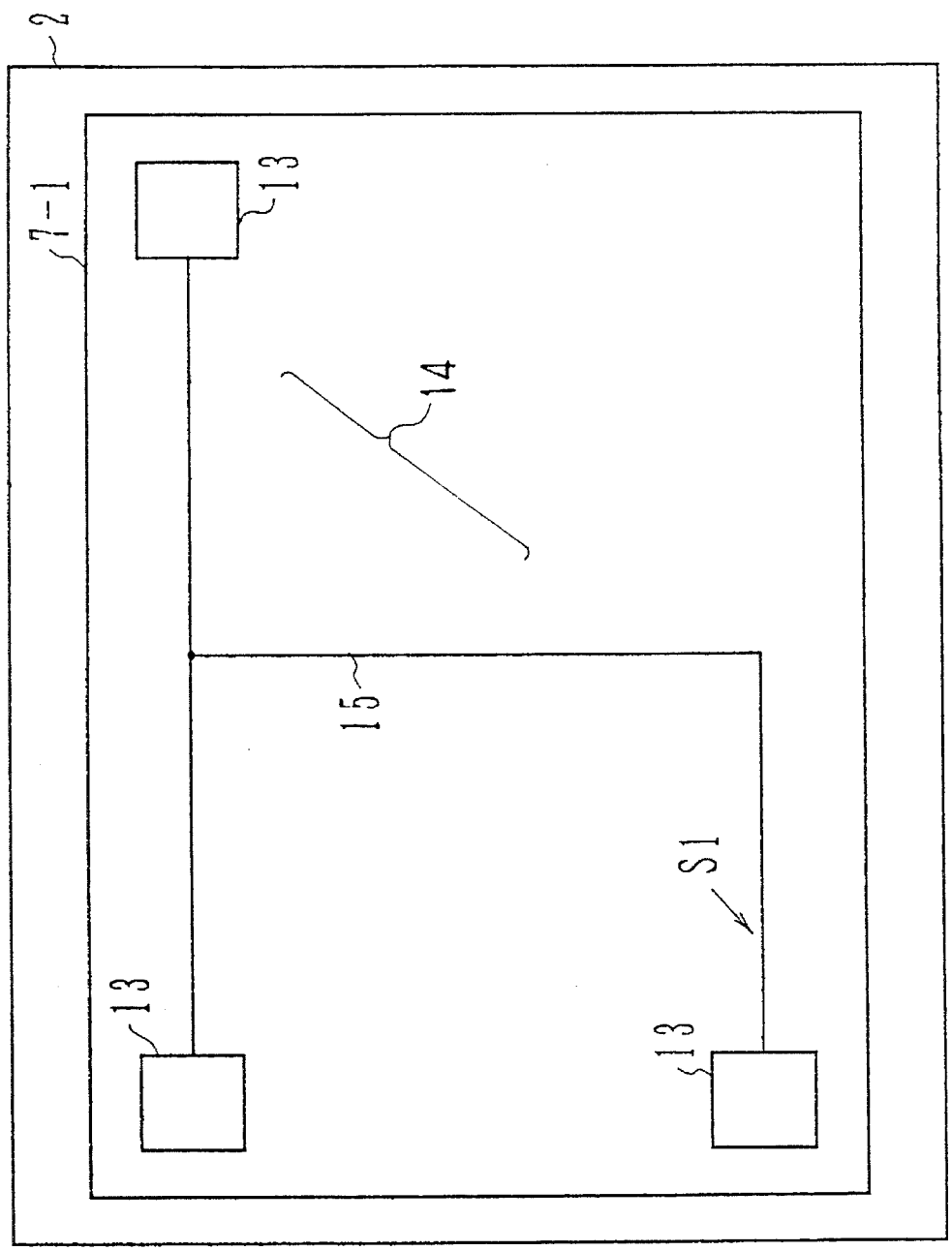
FIGS. 4 through 8 are processing examples for "noun to verb" type operations.

(1) Step 1: A click of a first button of a mouse designates a line of the net in the circuit diagram. (FIG. 4)

(2) Step 2: The line selected in Step 2 shows that it is in a selected status by changing its color.

Figure 5:
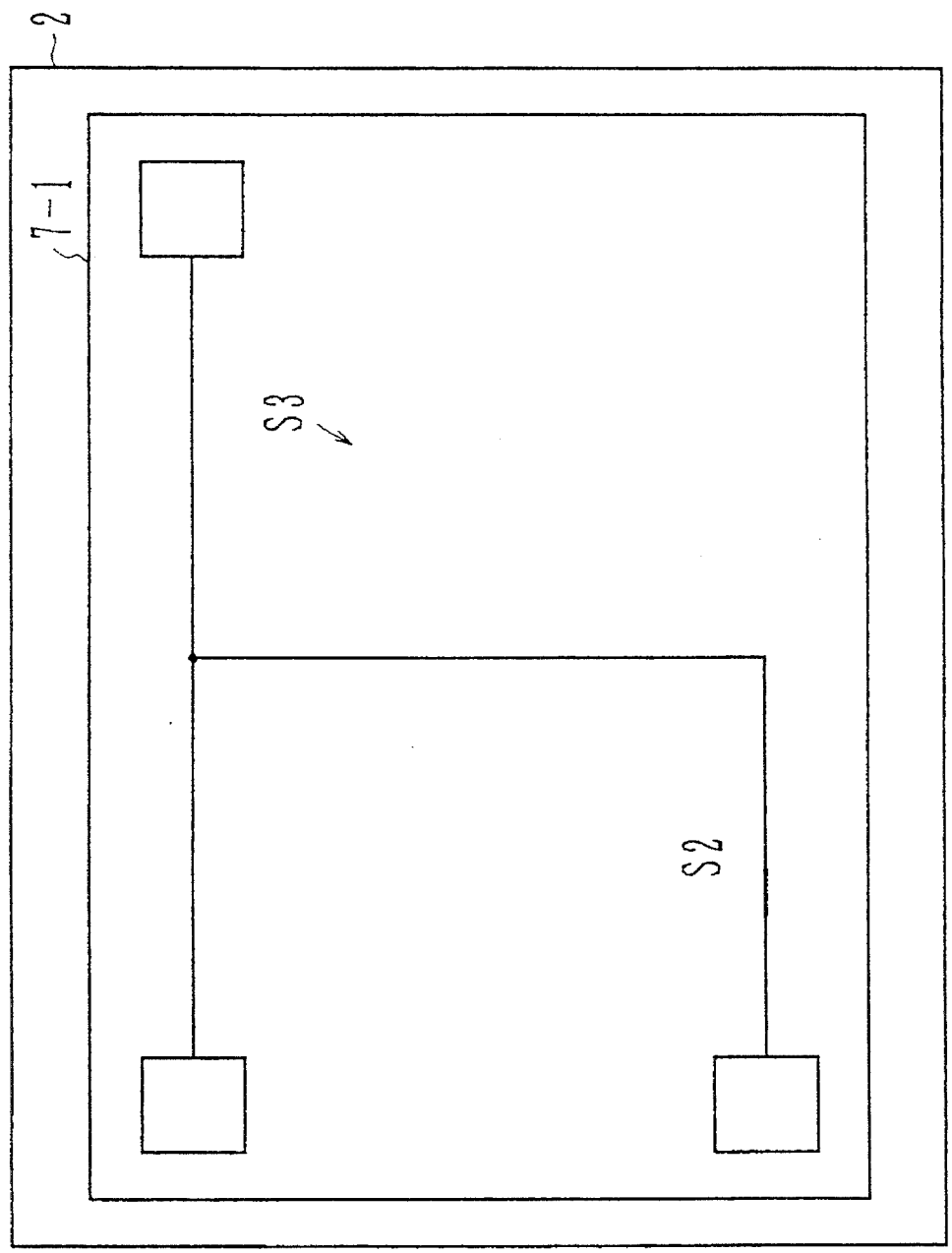

Step 3: A click of a second button of a mouse requests a pop-up display of command menus. (FIG. 5)

(3) Step 4: The command menus are pop-up displayed at the position designated in Step 3. Since the displayed hierarchy is of a primary menu representing a "verb" the displayed command is limited to a command of the "verb"

related to the component of the pre-selected "net" "Verb" commands such as "rotate", related only to a "component symbol" or "terminate" without any "object", are not displayed on the menu 3-1 shown in the drawing.

Figure 6:
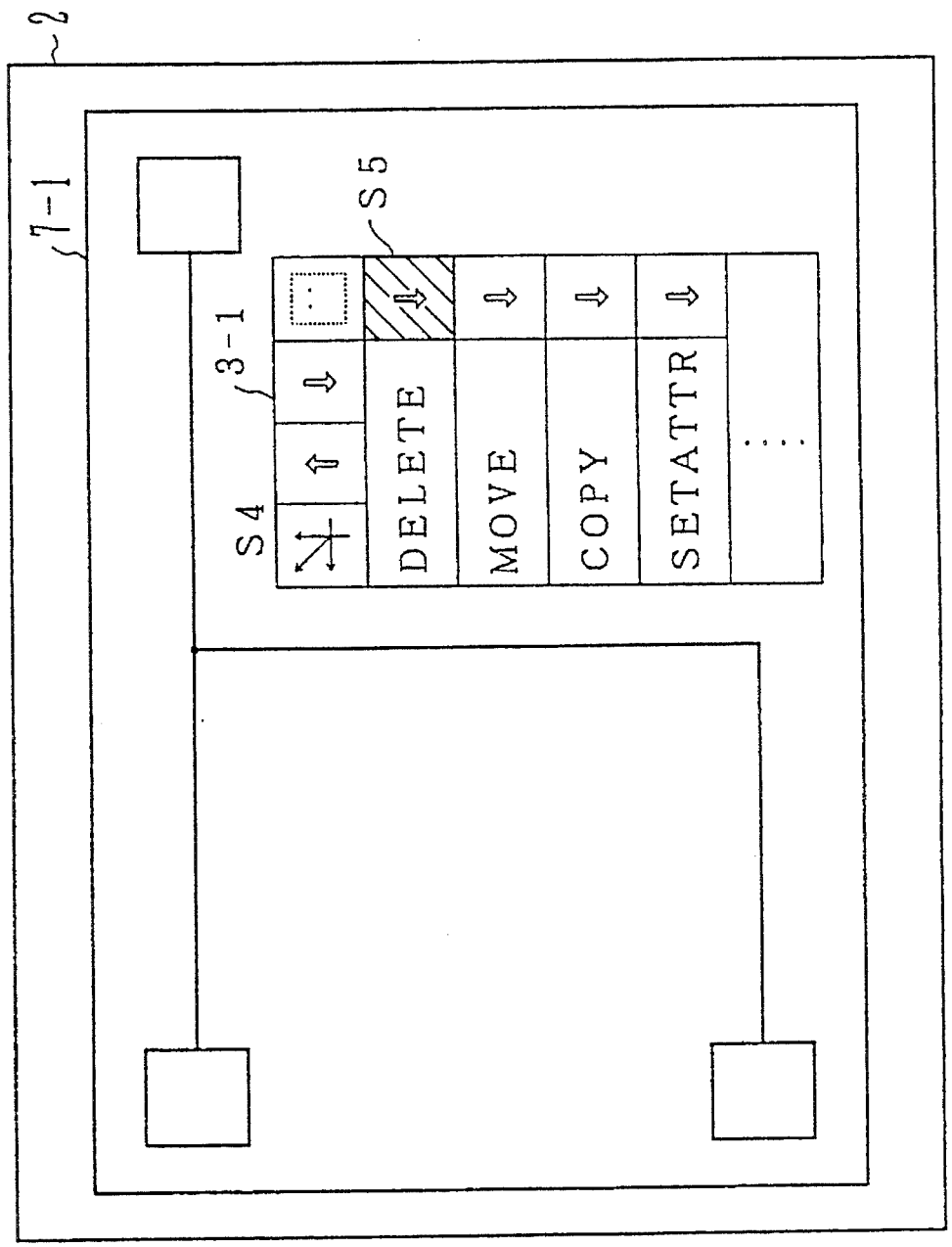

Step 5: A click of the first button of the mouse designates the junior branching mark of "delete". (FIG. 6)

(4) Step 6: Since the component pre-selected at a time of junior branching under the instruction in Step 5 is pre-judged to be related to the "net", a selection of an object menu is skipped, and a "path" and a "net" are displayed as complements in lieu of net deletion on the complement menu 3-3. A "delete" and a "net" which indicate already defined senior hierarchies, are stack-displayed above them.

Figure 7:
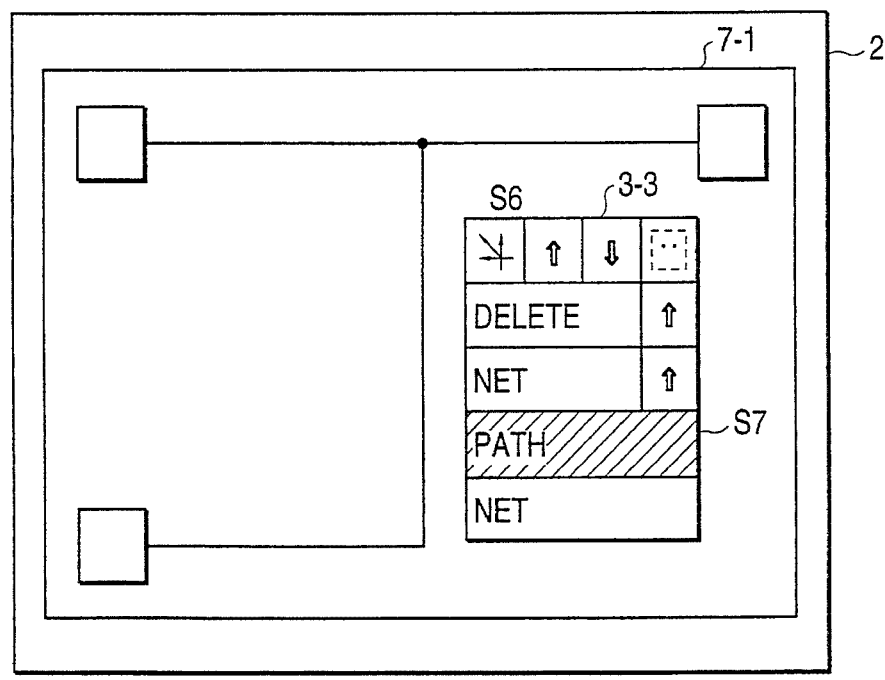

Step 7: A "path" is designated. (FIG. 7)

(5) Step 8: A command selection is completed, and the pop-up displayed menus are automatically deleted.

The command menu instructions up to this point have chosen the following command operations.

A "net" (component's pre-selection) is "delete"d (selected on a menu) in a "path" (selected on a menu).

Figure 8:
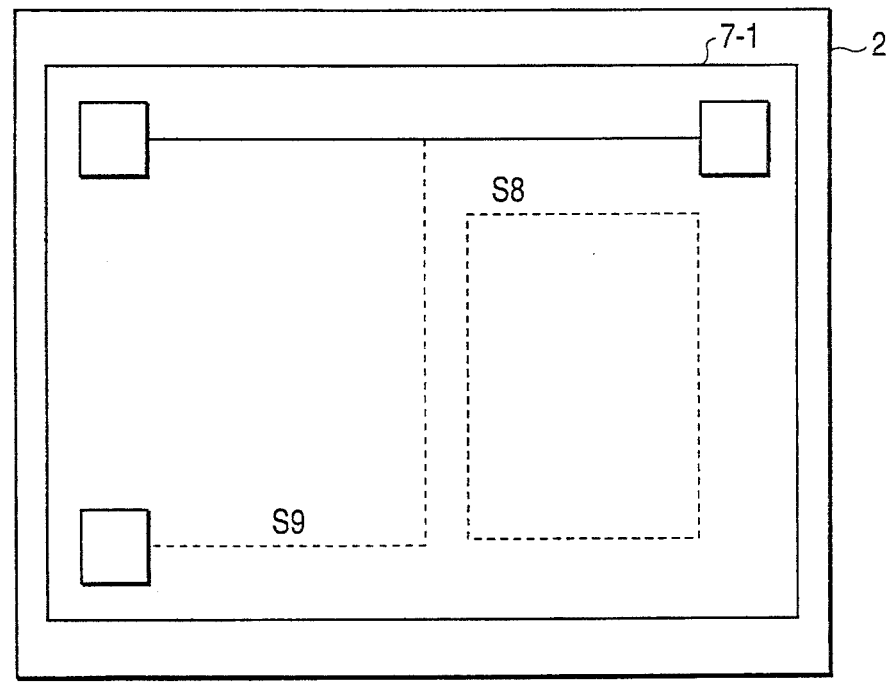

Step 9: According to the instructions of the above command operations, a net in a path including a pre-selected line is deleted. (FIG. 8)

FIGS. 9 through 15 show processing examples for the "verb to noun" type operation. Their operations are as follows.

Figure 9:
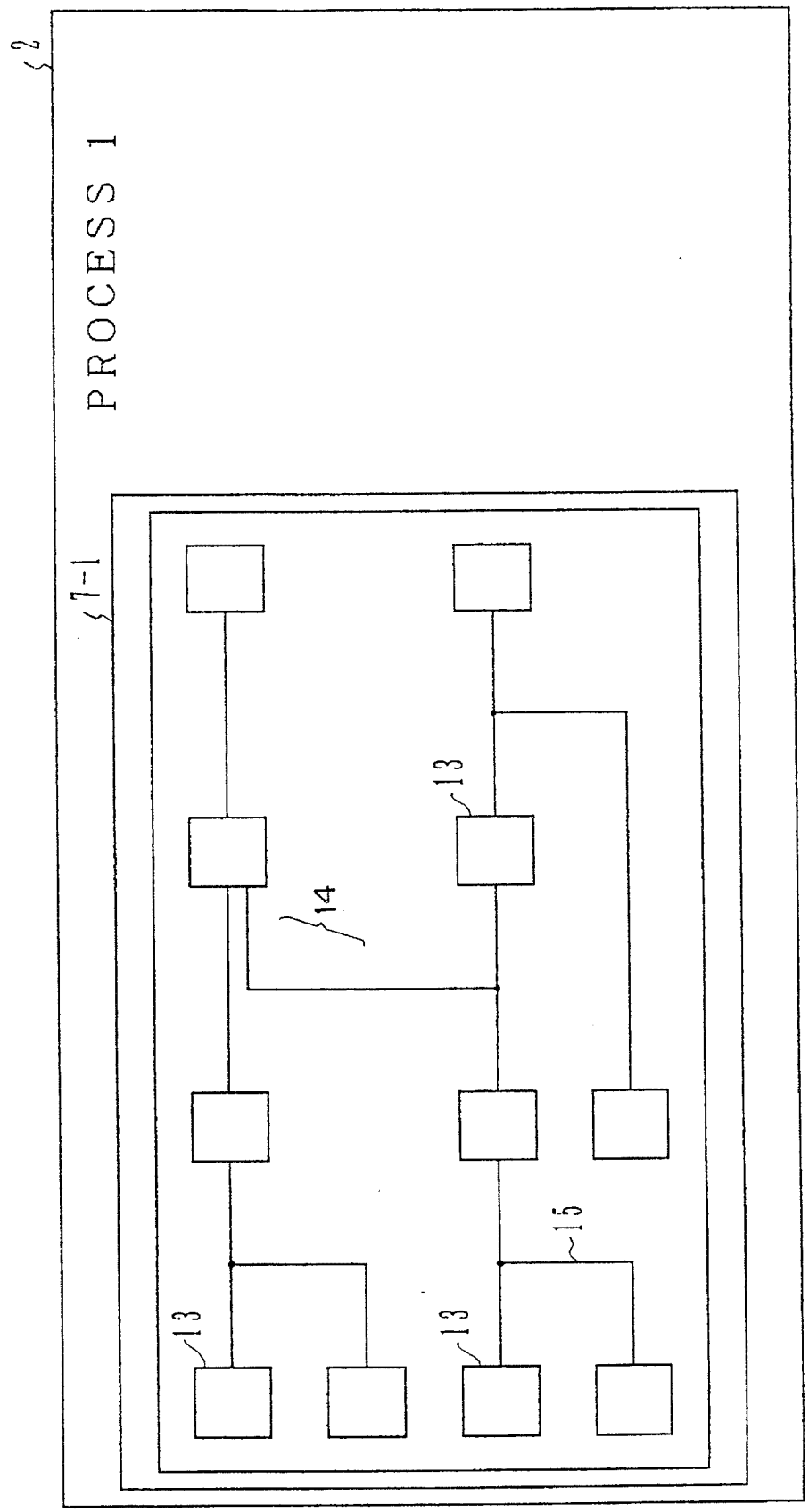
FIGS. 9 through 15 are processing examples for "verb to noun" type operations.

(6) Process 1: The second button of the mouse clicks a point on the screen and requests a pop-up display of a command menu. (FIG. 9)

(7) Process 2: The command menu is pop-up displayed in the position designated in process 1. The displayed primary menu for indicating a "verb" can select any "verb" If many "verbs" can be selected, instead of necessarily displaying all of them, a scrolling should be considered in which a display is divided into two or three parts. Unlike the "noun to verb" type operations shown in FIGS. 4 through 8, since an edit object component that becomes the antecedent "object" is not yet selected, the menu is not yet limited.

Process 3: A "permanent stationing icon" of a pop-up displayed command menu is designated, and the command menu is put in a permanent stationing mode.

Figure 10:
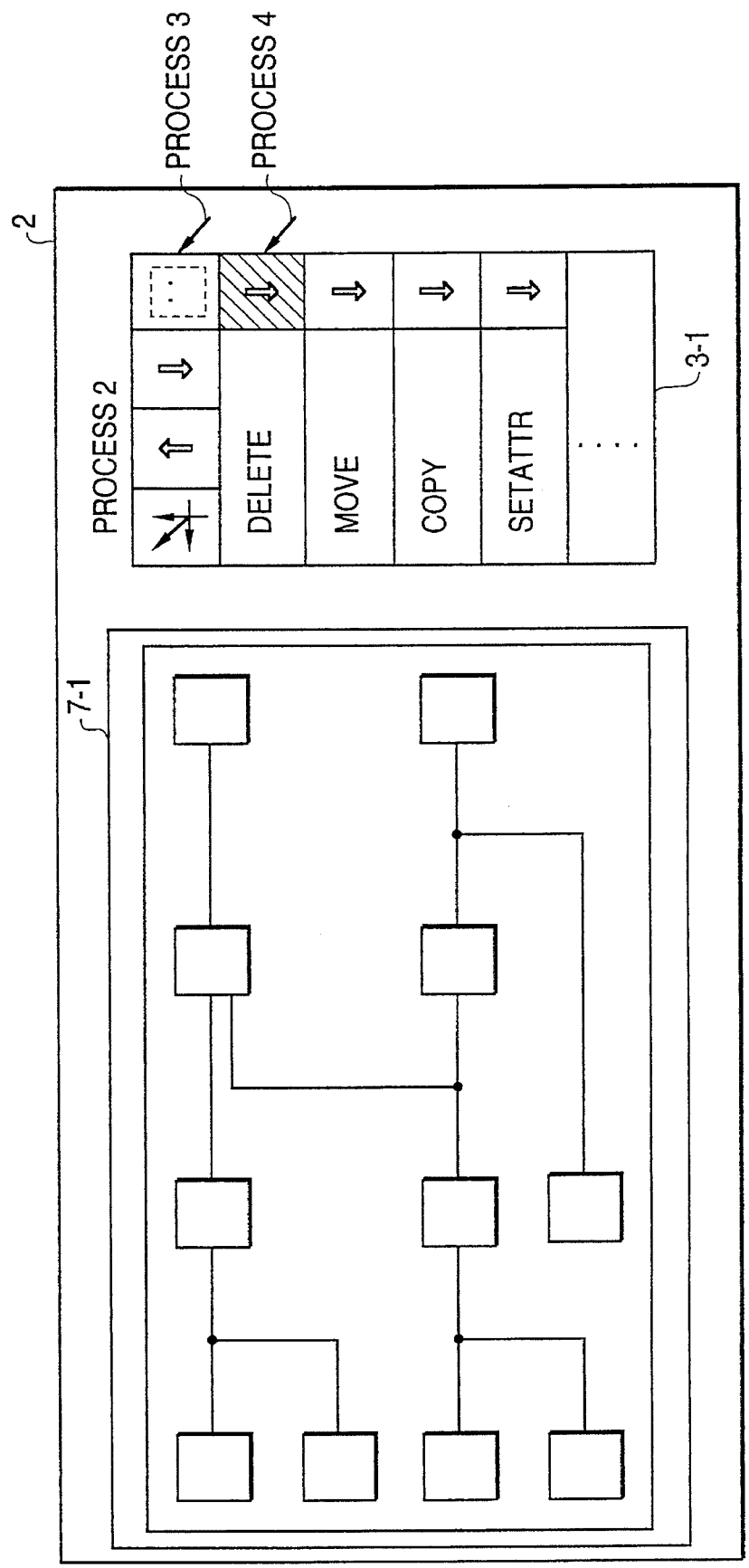

Process 4: A skeleton arrow junior branching mark of the verb "delete" is designated. (FIG. 10)

(8) Process 5: The section for the "object" of the secondary menu is designated by Process 4. In the earlier stated "noun to verb" type operation, since a net is already selected, this secondary menu is skipped.

However, in the "verb to noun" type operation, since a noun is not yet specified, the noun is designated in the following manner.

Figure 11:
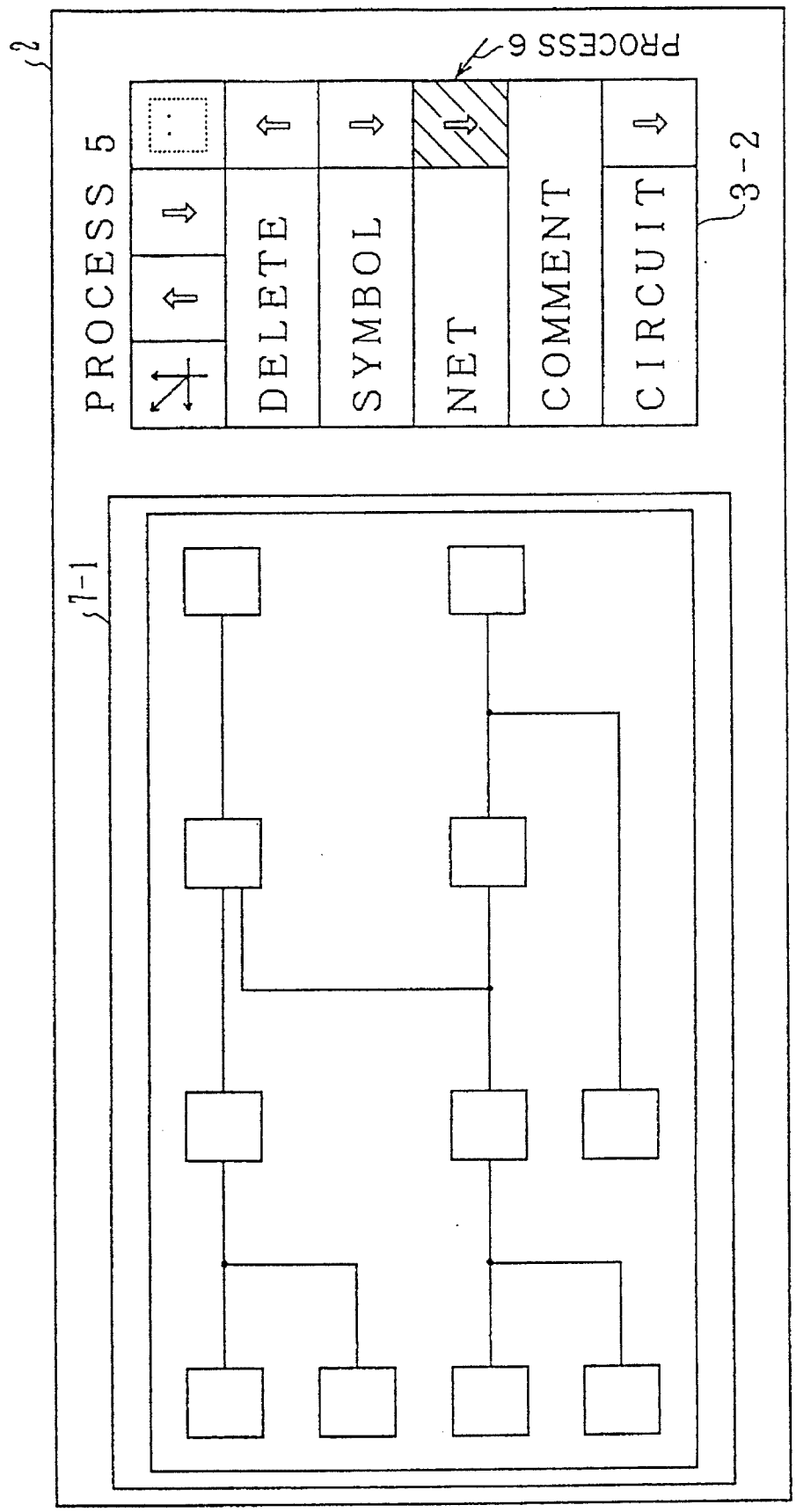

Process 6: A junior branching mark of a downward skeleton arrow for a "net" is designated. (FIG. 11)

(9) Process 7: A tertiary menu indicating a "complement" is displayed.

Process 8: A deletion of a net of a "path" is instructed.

At this point, although the selection of a command operation is completed, since a permanent stationing mode is selected in Process 3, the command menu is not deleted, and the display of the tertiary menu is maintained.

Figure 12:
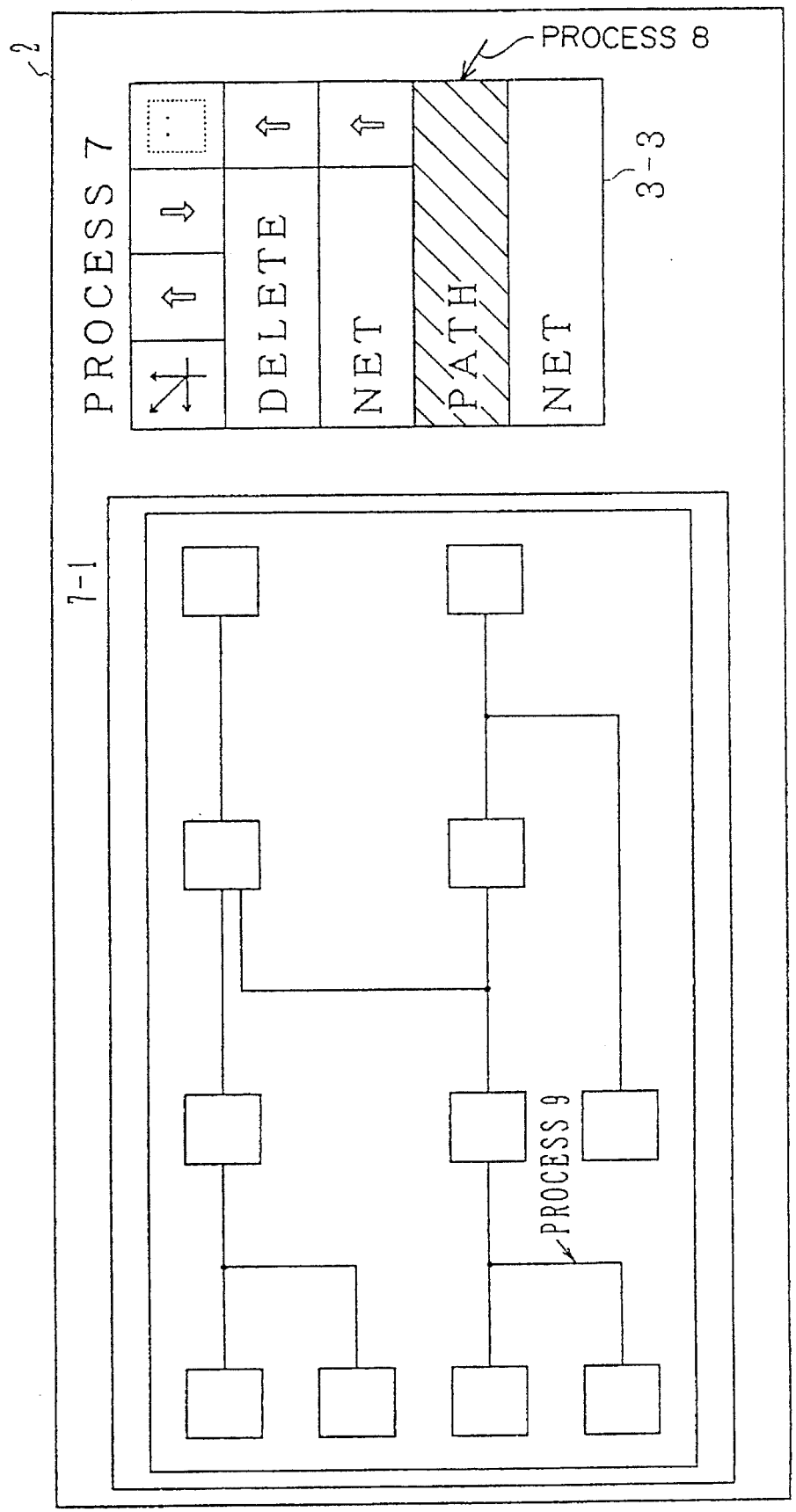

Process 9: A line in the net is selected. (FIG. 12)

(10) Process 10: The net of the path including the line designated in Process 9 is deleted.

The deleting processings are repeated by similarly selecting other nets on an on-going basis.

Figure 13:
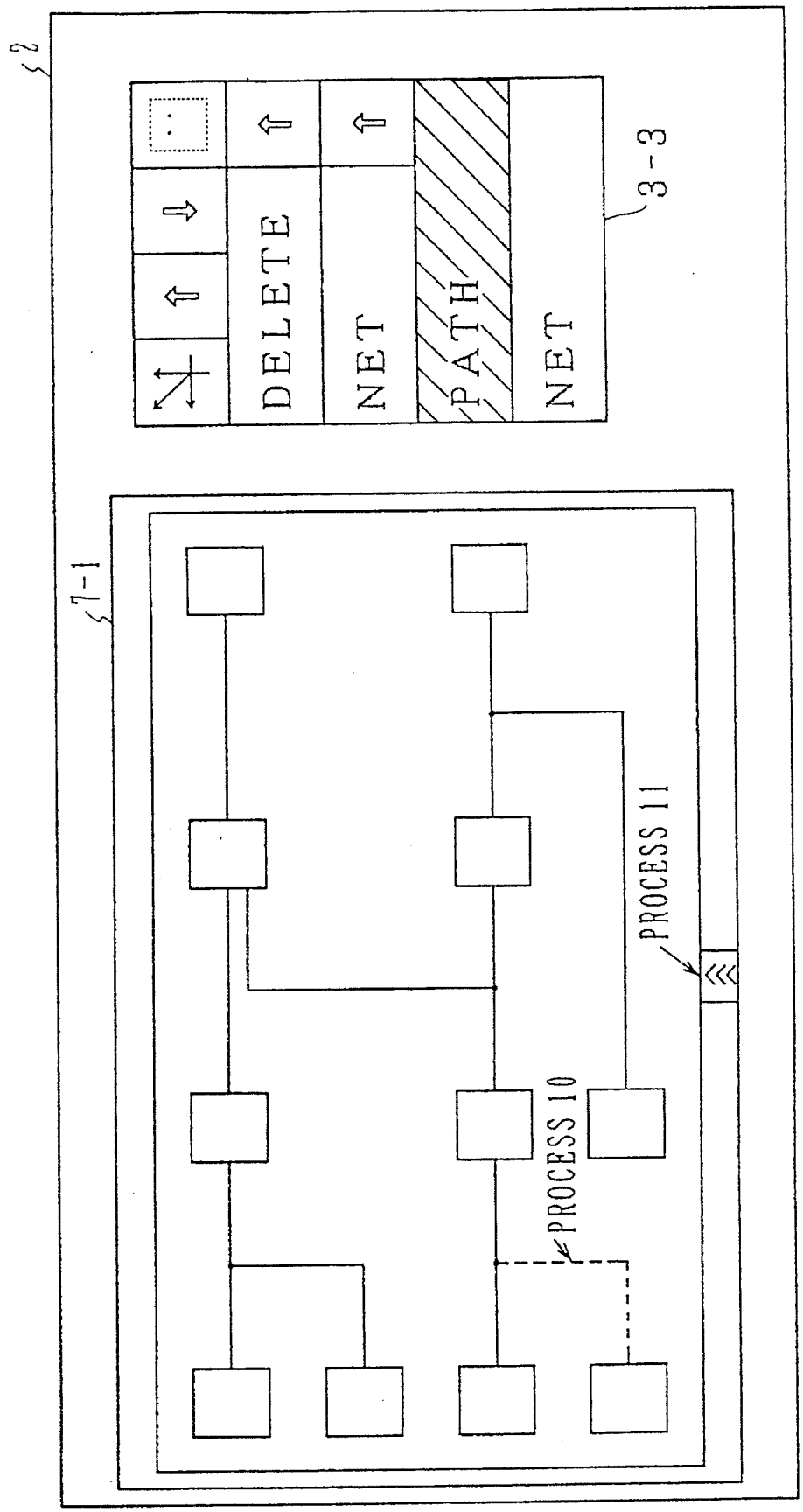

Process 11: An icon instructs a magnification of a circuit diagram. (FIG. 13)

(11) Process 12: The center part of the circuit diagram is displayed in a magnified form.

Process 13: The tertiary menu, which continues to be displayed, designates a "net" which is another complement. That is, the deleting scope unit changes from a "path" to a "net".

Figure 14:
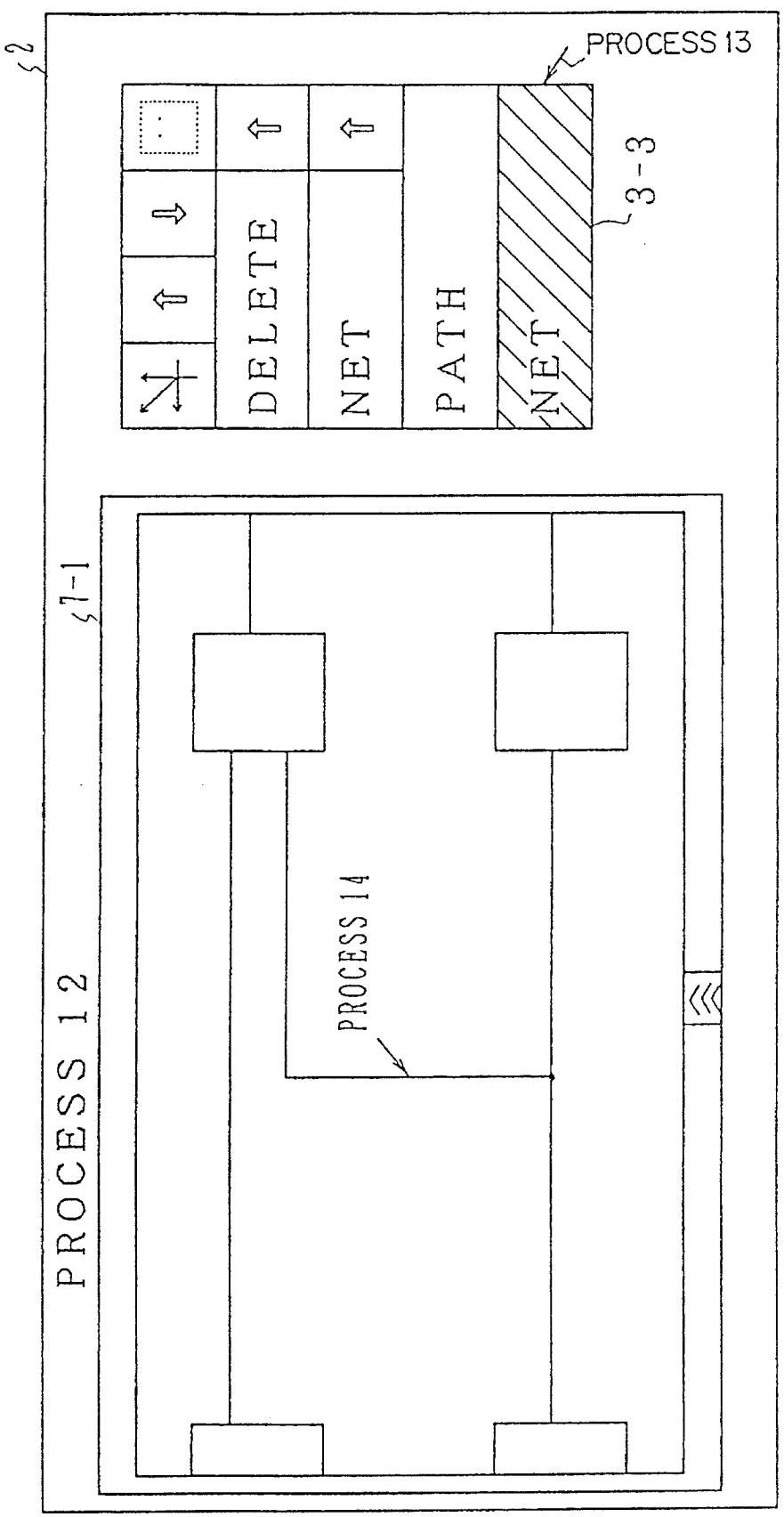

Process 14: A line in the net is selected. (FIG. 14)

Figure 15:
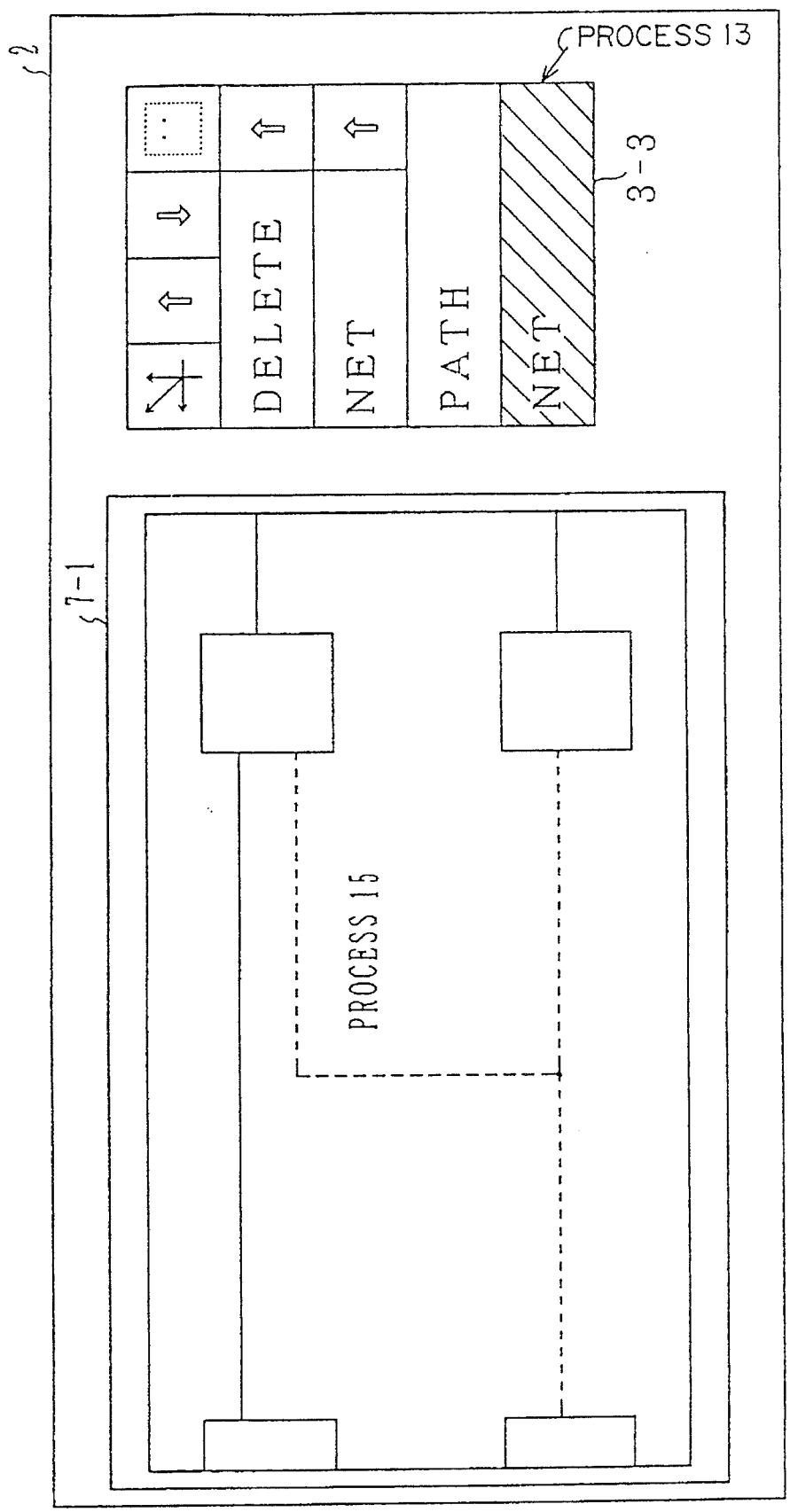

(12) Process 15: Unlike the previous path deletion up to a branching point, the scope of the deletion extends to the entire network ranging to all connected points. (FIG. 15)

Figure 16A:
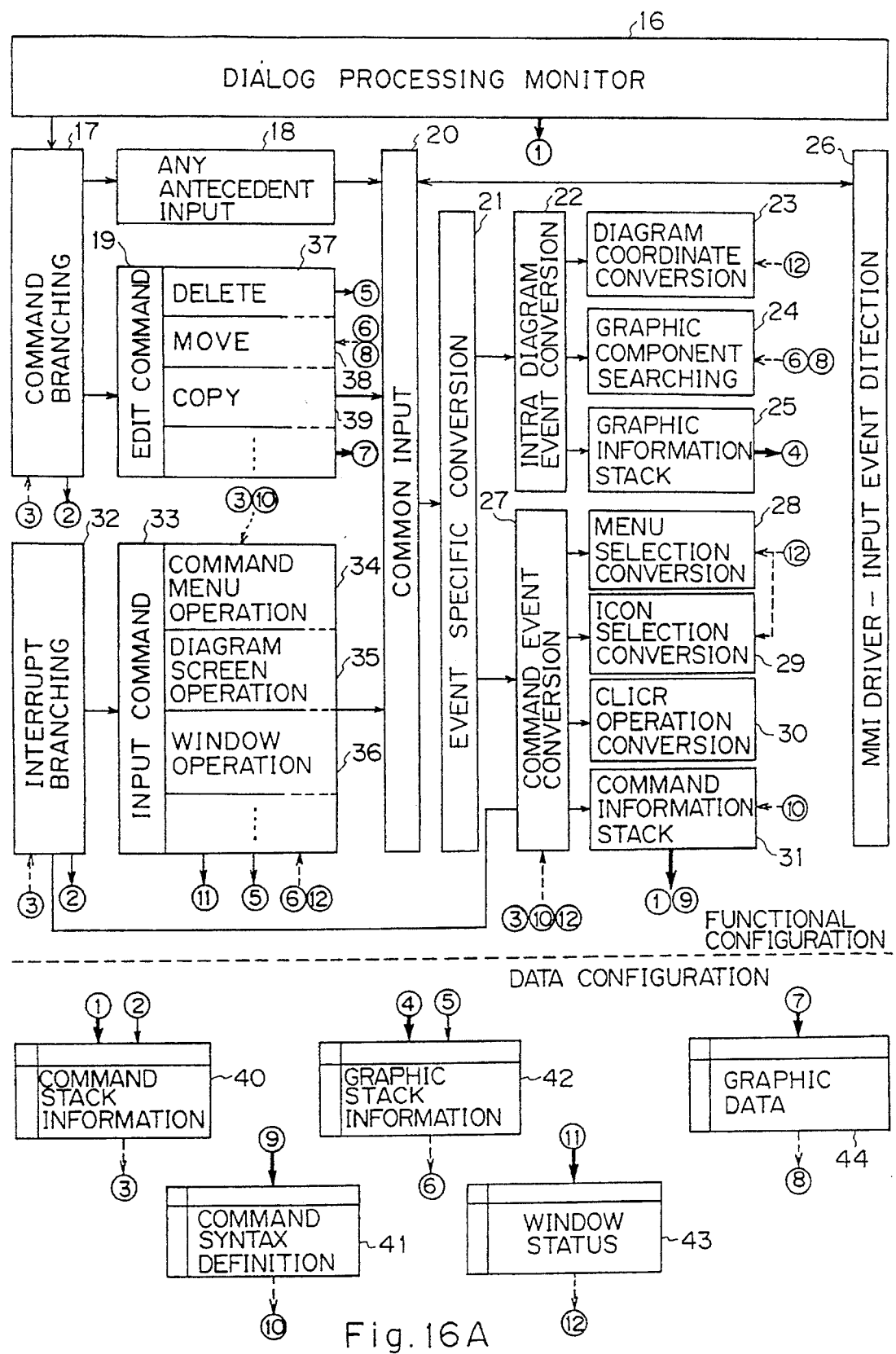
FIG. 16A shows the processing configuration of an embodiment for executing the method of this invention.

FIG. 16A shows the processing configuration of an embodiment for executing the method of this invention. Numbers 16 through 44 in FIG. 16A respectively indicate the functions or information described later. [1] through [12] in FIG. 16A are respectively interconnected as indicated by the arrow [1] pointing to the output side and the arrow [1] pointing to the input side, and are linked by a line segment. For instance, as shown in the drawing, [2] from a command branching 17 and [2] from an interrupt branch 32 are each connected to [2] of command stack information 40. Further, in FIG. 16A: (i) the thin solid arrow line indicates a control signal line; (ii) bold solid arrow lines ([1], [4], [7], [9] and [11]) indicate data setting signal lines; (iii) intermediate solid arrow lines ([2] and [5]) indicate data reset signal lines; and (iv) dotted arrow lines ([3], [6], [8], [10] and [12]) indicate data reference signal lines.

A dialog processing monitor 16 takes charge of the entire control. In the state in which an edit command is not yet determined, "any antecedent input" 18 is executed. For realizing this, the dialog processing monitor 16 compulsorily and sequentially stacks the command names of "any antecedent input" 18, when the command stack information 40 is in an empty state (i.e. at a beginning time and an ending time of each edit command). All the processings end when "dialog processing termination" is executed for the edit command 19.

Figure 16B:
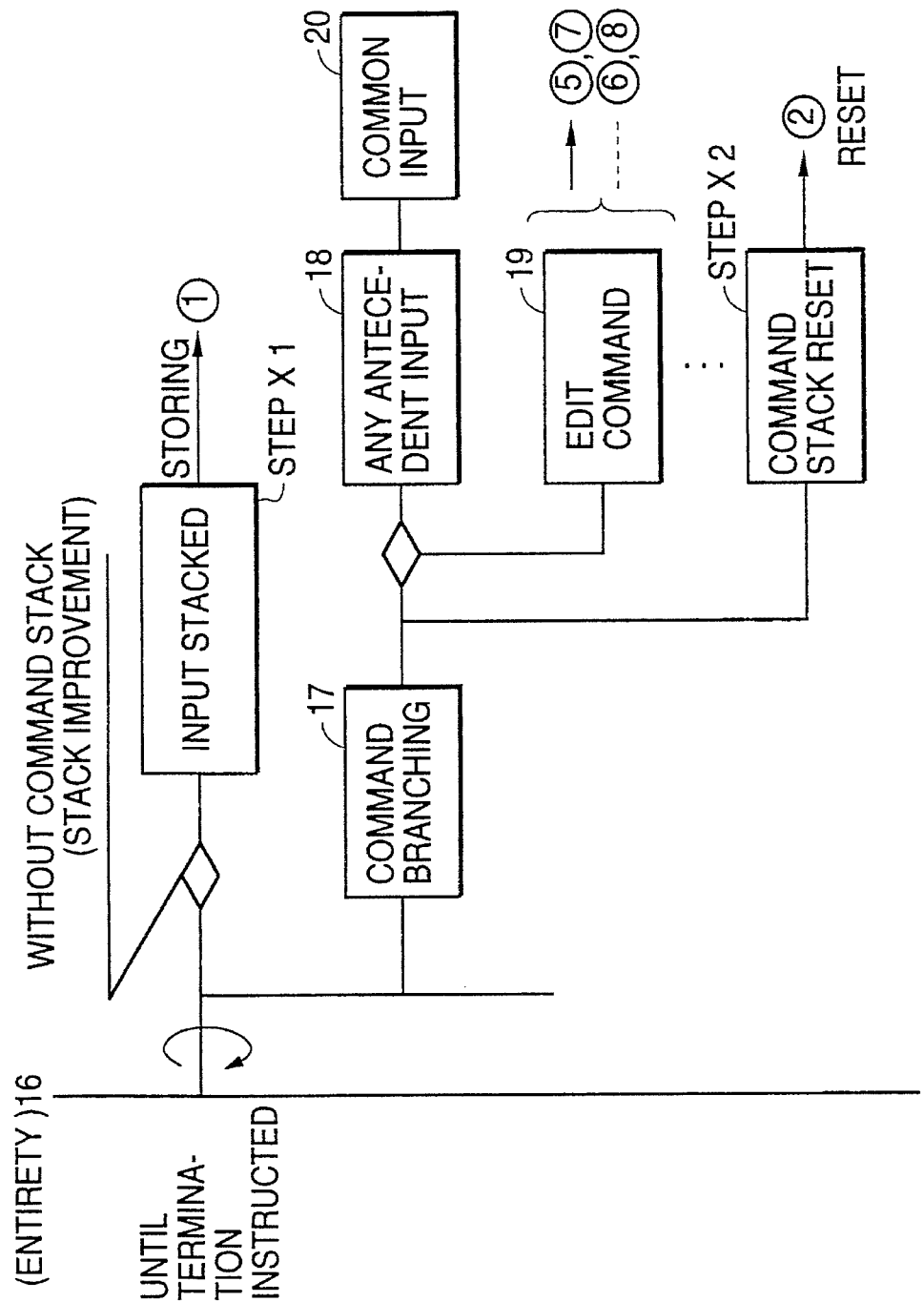
FIG. 16B is a processing flowchart for a dialog processing monitor.

Its processings are further explained by referring to FIG. 16B. In an execution of the dialog processing monitor 16, first the command stack information 40 is identified and "any antecedent input" 18 is stored in a stack. (Step X1). By this processing, any data such as a command is stored in the command stack information 40. (Refer to [1] in FIG. 16A.) When the input is stored by the processing Step X1, the command branching 17 operates. If the inputted data are "any input data" 18, the "common input" 20 performs specification [4] of graphics, or the like in a state such that the common input 20 has not yet made any command designation. If the inputted data are of the edit command 19, the edit command 19 is executed. In this execution, the graphic stack information 42 and the graphic data 44 are referred [6] and [8], and the executing result is stored [5] with the graphic stack information 42. When its execution is completed, the command stack information 40 is reset [2]. (Step X2) These sequential operations are repeated.

The command branching 17 branches "any antecedent input" 18 and a generic edit command 19 into commands of the objects, according to the command stack information 40. The command stack information is reset simultaneously.

The interrupt branching 32 branches the CPUs' processings into interruption processings corresponding to operations such as a diagram screen operation 35 for magnification within the diagram, etc. and a window operation 36.

Like the generic edit command 19, the interruption processing branches depending on the command stack information 40 Whereas the "command branching" 17 is under the control of the "dialog processing monitor" 16, the "interrupt branching" 32 takes over the control from a "command event conversion" 27 in a "common input" 20.

"Any antecedent input" 18 becomes a "trigger input" for expediting the selection of the graphic component that becomes an "antecedent object (noun)" in a "noun to verb" type operation and "command menu display to selection" in the status of edit command undecided. The sub-menus of the "common input" 20 actually perform a graphic stack or a command stack. Here, only the "common input" 20 is repeatedly called up, until the edit command 19 is determined.

The edit command 19 obtains a graphic component by making a graphic component an edit object if an "antecedent object (noun)" is pre-selected by "any antecedent input" 18, and by calling up a "common input" 20 if it is not. In either case, the graphic component is obtained through a region of "graphic stack information" 42. An edit processing updates "graphic data" 44 composing the diagram, and the utilized "graphic stack information" 42 is reset. Thus, this is a command for updating the graphic data 44, comprising a "delete" 37, a "move" 38 and a "copy" 39, for instance.

Figure 16C:
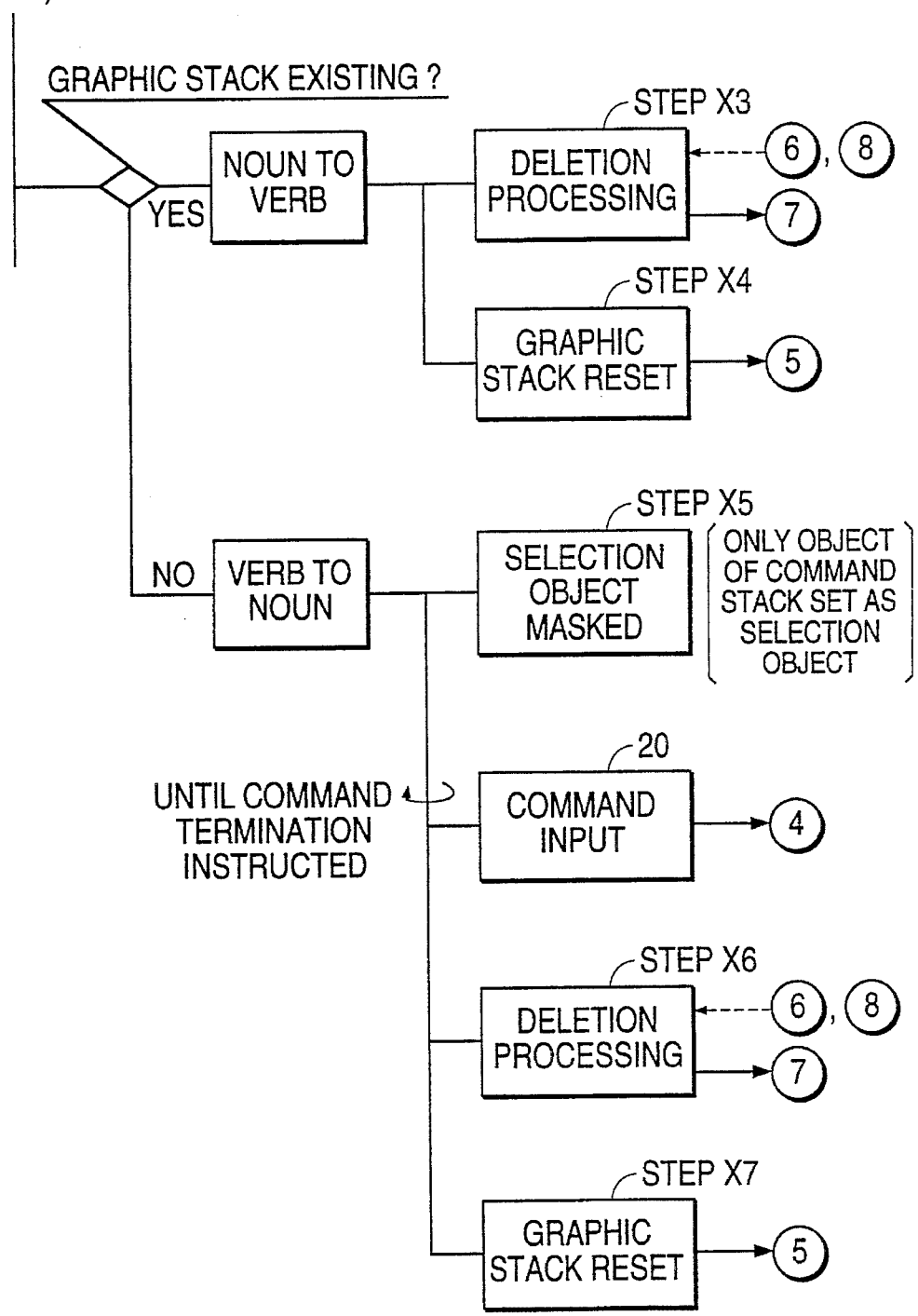
FIG. 16C is a processing flowchart for a "delete" command.

When a "delete" in the edit command 19 is selected, as shown in FIG. 16C, first an existence of a graphic stack is judged. If one exists, since it is a "noun to verb" type command, Step X3 for deleting the object which is a designated noun is performed. That is, the objective graphic information is deleted from the graphic stack information 42 and the graphic data 44. The result is set as new graphic data 44, and the graphic stack 42 is reset. (Step X4) Meanwhile, if a graphic stack does not exist (NO), since it is a "verb to noun" type command, the selection object is masked first. (Step X5) This processing makes only an object corresponding to a command for an object to be selected. The common input 20 inputs the designated object and deletes the graphic which is the designated object. The common input 20 inputs the designated object and then deletes the graphic which is the designated object (Step X6) and resets the graphic stack 42 (Step X7). Then, the common input 20 makes the next graphic designation. This processing is repeated until the command termination is instructed. Incidentally, the earlier described Step X4 and Step X6, and Step 4 and Step 7 are identical pairs of processings.

When the command termination is instructed, this command, i.e. the delete command, is terminated.

The interrupt command 33 is a mainstream for revising the window status 43. In contrast, the "edit command" 19 is for updating the "graphic data" 44 on the screen that obtains the coordinate position of the window. The display operation by the command menu operation 34 belongs to the interrupt command 33 and updates the display condition of the command menu, according to the the current "command stack information" 40 and a "command syntax definition" 41.

Figure 16D:
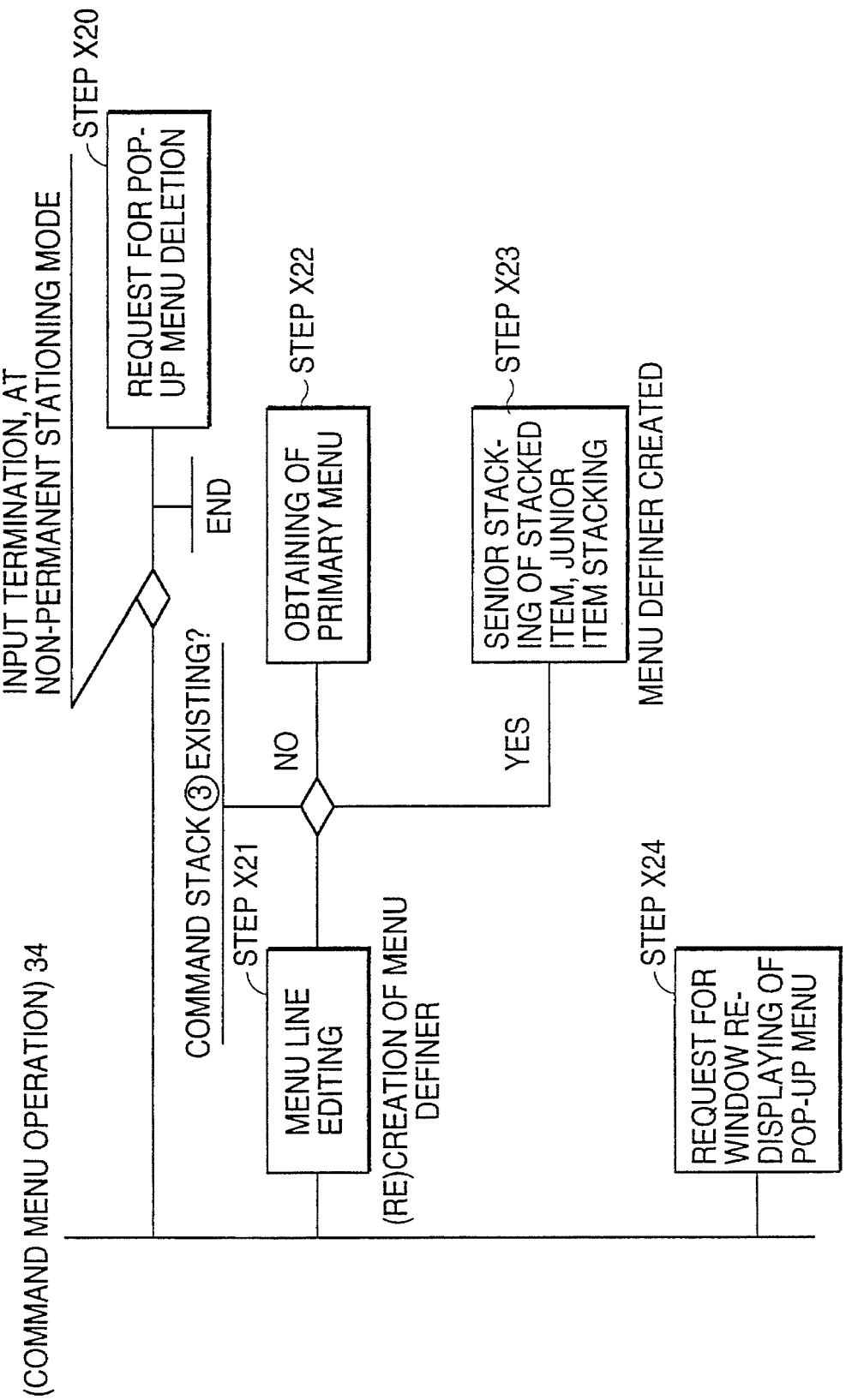
FIG. 16D is a processing flowchart for a command menu operation.

The command menu operation 34 is shown in FIG. 16D. First, in case of a non-permanent stationing mode at an input termination, a deletion of the pop-up menu is requested and ended. (Step X20) By this request of deletion (Step X20), the MMI driver 26 described later deletes the display of this pop-up menu. Second, when the input is not terminated or in case of a non-permanent stationing mode, a menu line editing Step X21 is executed, and menu definers are recreated. Therefore, first, the existence of a command stack is judged. When there is no command stack, a primary menu is obtained (Step X22); and when there is a command stack, the menu definer is stacked above a line for a stack item and the junior items are also stacked (Step X23). Step X23 thus creates a menu definer. Then, redisplaying of a pop-up menu on the window is requested (Step X24).

The MMI driver 26 also displays what is requested by this redisplaying request.

Figure 16E:
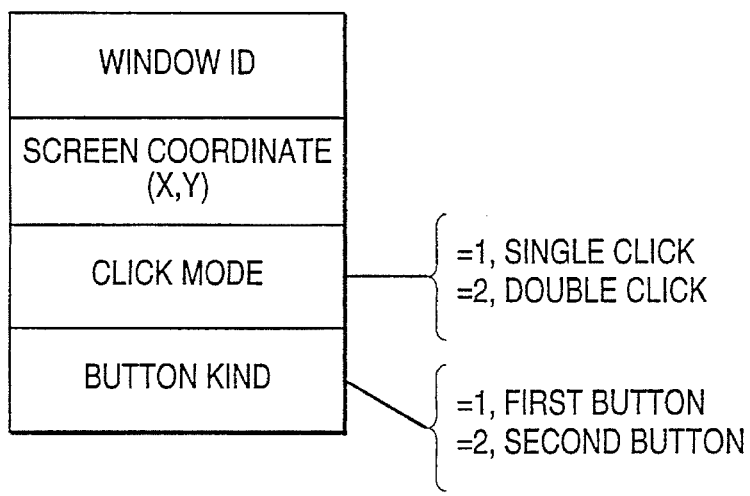
FIG. 16E is a table showing the structure of input event data; (from MMI driver)
Figure 16I:
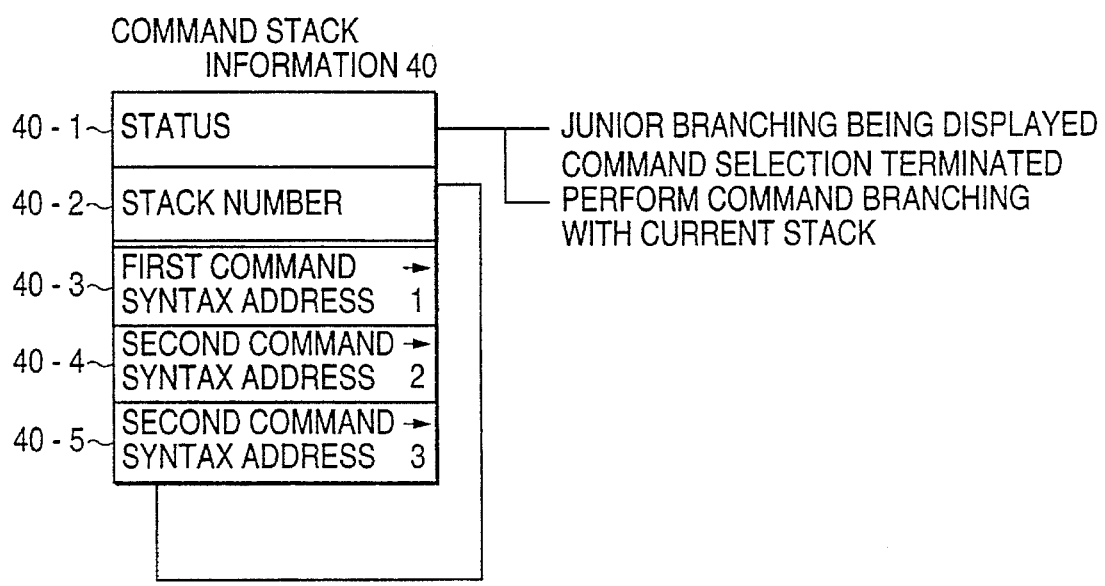
FIG. 16I is a table showing the structure of command stack information.
Figure 16F:
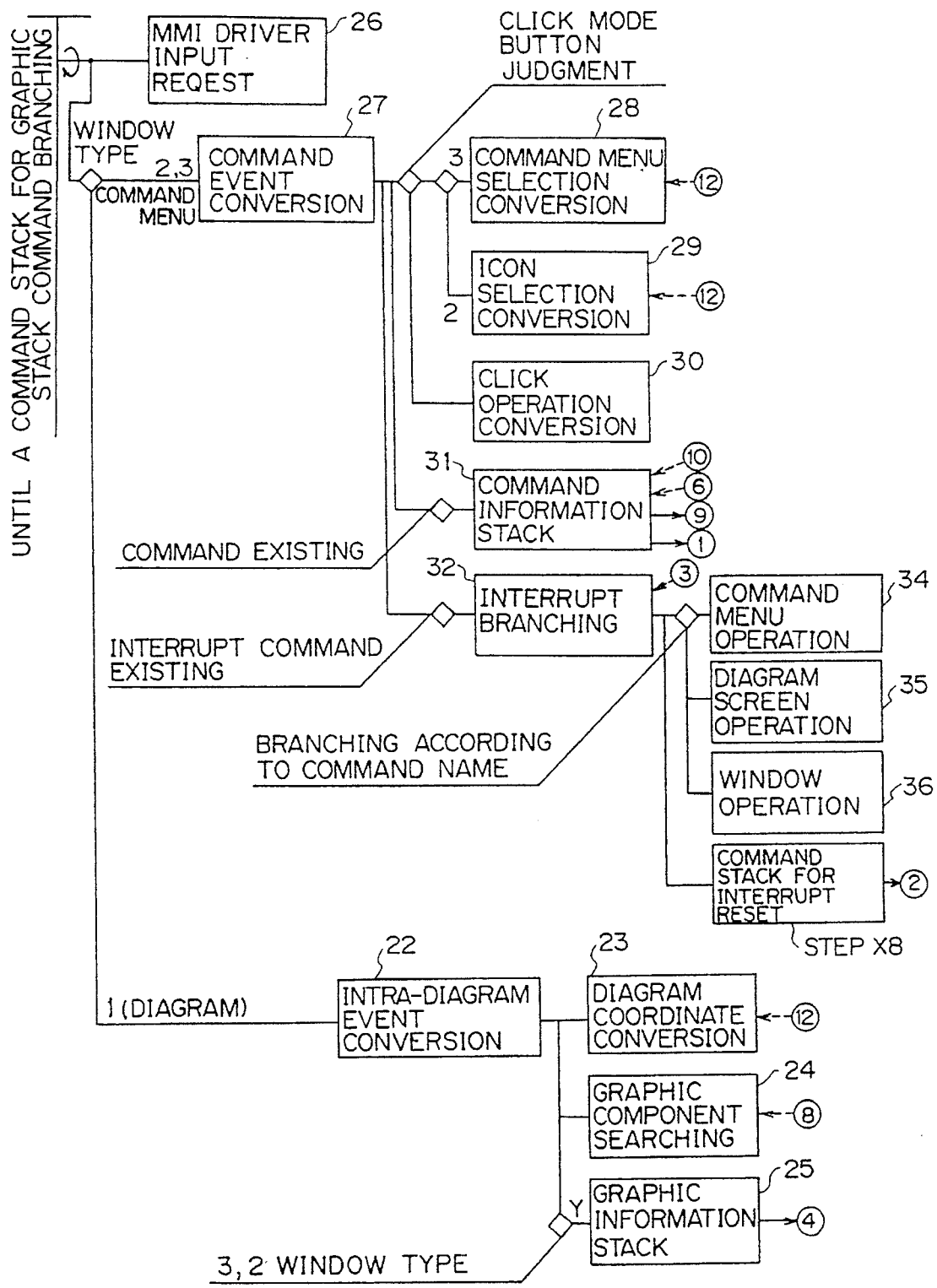
FIG. 16F is a processing flowchart for a common input.

The common input 20, as shown in FIG. 16F, is called up by all commands and is for commonly taking charge of a graphic input. It makes an event classification from the coordinates on each window obtained from the "MMI driver" 26 into an intradiagram input and a command selection.

The common input 20 repeats the following processings, while a graphic stack or a command stack exists, i.e. until an input other than an interrupt input occurs.

First, it is judged which window (window type) the (mouse designated) input from the later described MMI driver 26 designates. In case of a command menu (type 2 or 3), the command event conversion 27 judges the window type and a click mode button. When the window (window type) is 3, i.e. a pop-up command menu, the command menu selection conversion 28 reads the window status and performs a command conversion. When the window (window type) is 2, i.e. an icon, the icon selection conversion 29 similarly performs a command conversion. In case of a mouse button click, the click operation conversion 30 judges the click of a click operation, i.e. what the click is. In this case, it is performed with the input event data handed over from the MMI driver 26 (FIG. 16E). For instance, a single click of a first button designates a command menu.

If results of the earlier described conversions 28, 29 and 30 are commands, the command information stack 31 is executed. The command stack information 40 and the command syntax definition 9 are stacked.

Meanwhile, when an interruption to the interrupt command 33 occurs, the interrupt branch 32 executes the command menu operation 34, the diagram screen operation 35 and the window operation 36 corresponding to command names. Whichever operation is executed, after its termination, the interrupt command stack 31 and resetting is performed (Step X8).

After the above sequences, processings for the diagram are executed. That is, the processings for the window type (=1) are executed. First, in the intra-diagram event conversion 22, the diagram coordinate conversion 23 performs a coordinate conversion in correspondence with the display scope of the diagram displayed on the window. The graphic component conversion 24 obtains the graphic component existing on the coordinate. The graphic information stack 25 stores the graphic information in the graphic stack information 42. Then, as described earlier, these processings are repeated until a command stack for command branching is inputted.

The MMI (Man-Machine Interface) driver 26 detects an input event accompanying a mouse instruction and notifies the "common input" 20 of a button classification and an designation window and an intra-window position.

The event specific conversion 21 roughly classifies the input event notified from the "MMI driver" 26 into an "intra-circuit event" and a "command event" and converts them into desired information.

The intra-circuit event information 22 comprises (i) a "circuit coordinate conversion" 23 for converting the physical position of the window corresponding to the displayed scope of the circuit displayed in its window; (ii) a "graphic component searching" 24 for selecting an intra-circuit graphic component existing on the coordinate; and (iii) a "graphic information stack" 25 for storing respective conversion results.

The command event conversion 27 performs a command event conversion at each part of (i) a "menu selection conversion" 28 and an "icon selection conversion" 29 for converting the selected information of the particular command when the window designated by the mouse is a display area for the menu icon, (ii) a "click operation conversion" 30 that becomes the trigger information for the pop-up command menu display, when the second button performs the click operation, and (iii) a "command information stack" 31 for storing these conversion results.

Figure 16G:
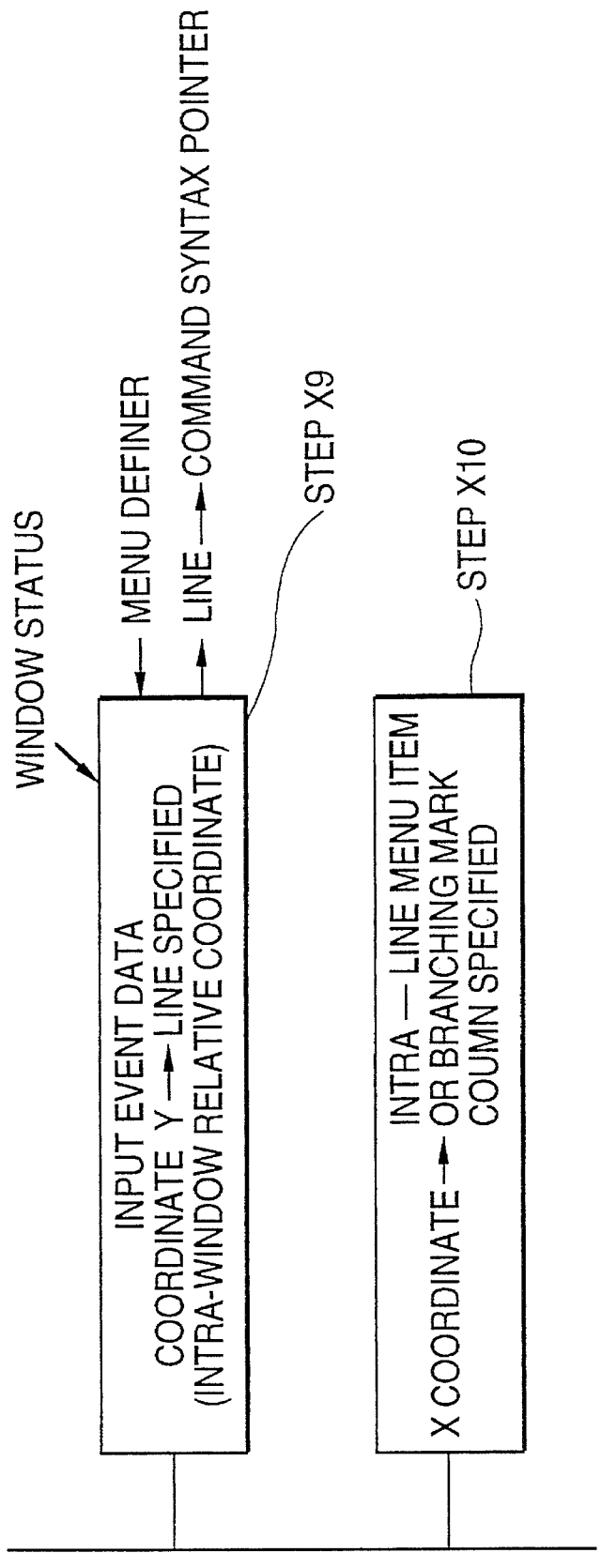
FIG. 16G is a processing flowchart for a menu selection conversion.

A command menu has menu items and corresponding upward or downward arrows. As shown in FIG. 16G, the menu selection conversion 28 reads a menu identifier or the like from the window status 43, and obtains the identification of a line (intra-window relative coordinate) from the Y coordinate of the input event data coordinate (Step X9) and the identification of a menu item designation or a branching mark designation, i.e. a column designation, from the X coordinate (Step X10).

Figure 16H:
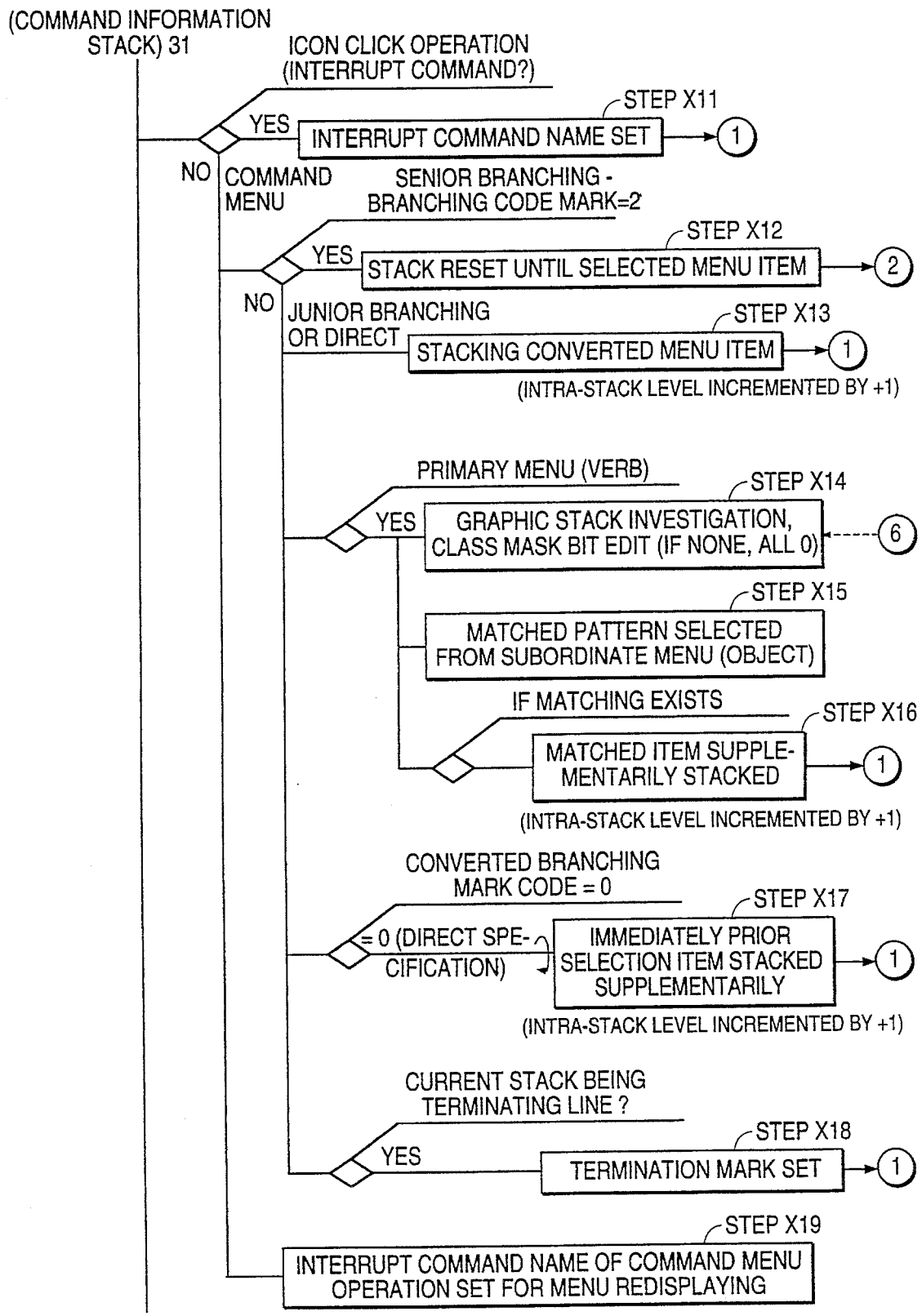
FIG. 16H is a processing flowchart for a command stack information.

The processing of the command information stack 31 is explained by referring to FIG. 16H. First, the click operation into an icon, i.e. an interrupt command, is judged. In case of an icon click operation, the interrupt command name is set in the command stack information 40 and terminated (Step X11). Meanwhile, if some other command is executed, when the senior branching mark is 2, i.e. when the upward arrow mark is set, the stacks to the selected menu items are reset (Step X12). In case of a junior branching or a direct marking, i.e. when a position other than a branching mark is marked, the converted menu items are stacked (Step X13). This is a movement to a junior hierarchy. At this time, the intra-stack levels are incremented by +1.

In case of a primary menu (verb), the graphic stack is investigated and the graphic component class mask bits are edited. When no graphic component exists, they are all set to "0" (Step X14). (Refer to FIG. 19.) A matched pattern is selected from a subordinated menu (object) (Step X15) when the matched pattern exists, and the supplement to the matched item is stacked. (Step X16) At this time, too, the intra-stack levels are incremented by +1.

When the converted branching mark code is "0", i.e. when a point other than an arrow is directly specified, the supplement to the immediately prior selection item which is the immediately preceding designated default value is stacked. (Step X17) At this time, too, the intra-stack level is incremented by +1, as described earlier.

When the current stack is the end line, i.e. when the instructions are given to the final line, the terminating mark is set. (Step X18) This terminating mark setting triggers an instruction of a command execution.

After the earlier described Step X12 through Step X18, the interrupt command name of the command menu operation is determined for redisplaying the command menu. (Step X19) With this setting, the MMI driver 26 displays the command menu.

When the selected command is an edit command, the "command information stack" 31 sequentially stacks each selected hierarchy and also positions the address of an "immediate pre-selection" on the "command syntax definition 41. When a menu item name" is designated instead of the downward skeleton arrow branching mark meaning a "junior branching line" in the next time, the command hierarchy of a junior concept is automatically stacked supplementarily. If the command hierarchies stacked as "command stack information" 40 reach the "end line" the "command event conversion" 27 requests the deletion of the command menus through the "interrupt branching" 32 to the "command menu operation" 34 (at a permanent stationing mode, the menu deletion is skipped in the "command menu operation" 34) and expedites the branching into the edit command 19 through "any antecedent input" 18 or a "common input" 20 of a senior controller. When the "interrupt command" 33 is selected, the "command event conversion" 27 hands the control over to the "interrupt branching" 32.

Figure 19:
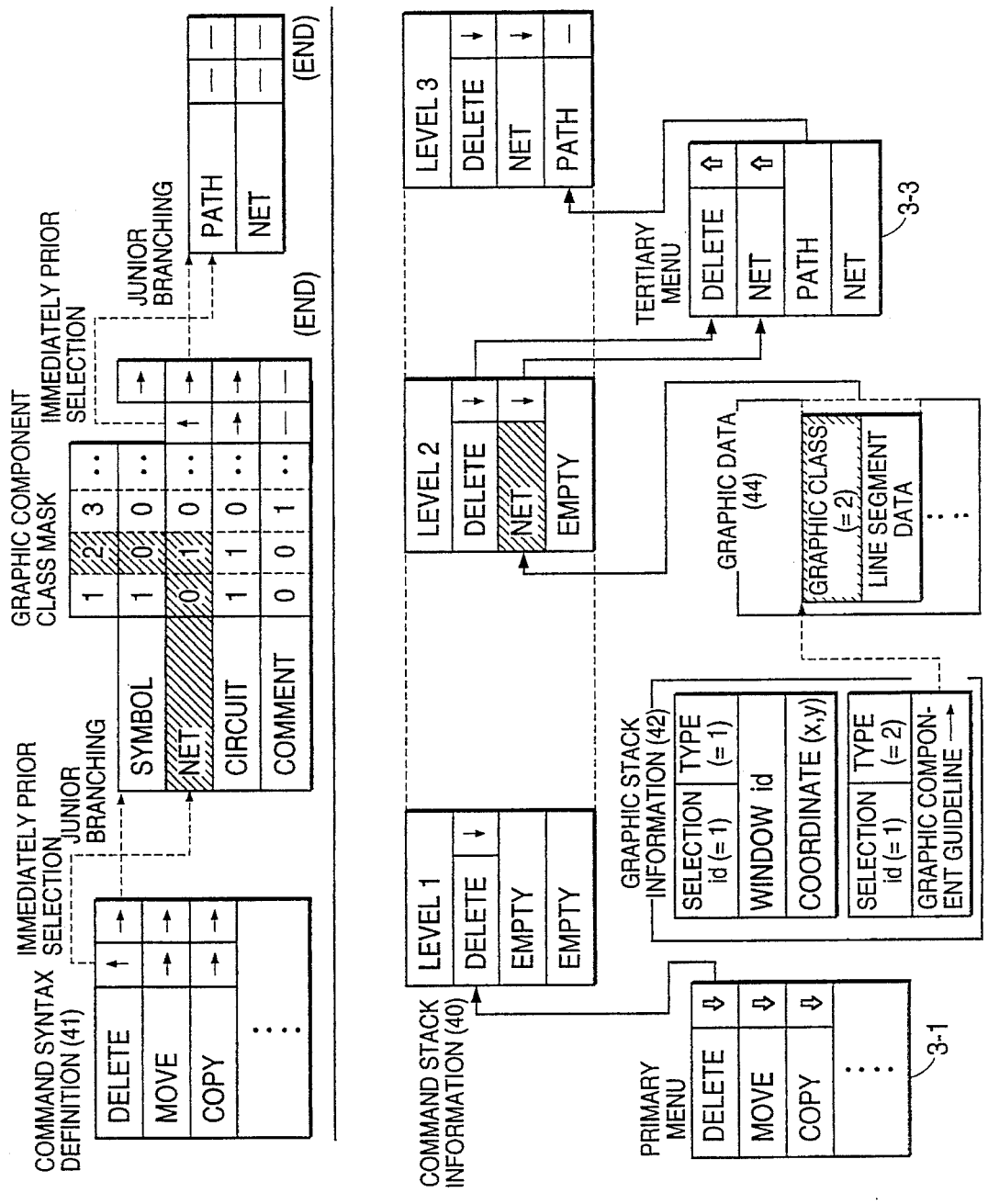
FIG. 19 shows the actions corresponding to a menu displayed in case of a "noun to verb" type operation.

The command stack information 40 stacks the command information corresponding to the icon or command menu selected. The command stack information 40 comprises status 40-1, stack number (level) 40-2 and first, second and third stack guidelines 40-3, 40-4 and 40-5. The status 40-1 shows the status of command selection: "0" indicates junior branching being displayed and "1" indicates command selection termination, i.e. a command branching with the current stack content. Then, the stack number (level) 40-2 is set. The level 40-2 clarifies whether or not the command selection has been performed up to the current position. Next, the three guidelines 40-3, 40-4 and 40-5 memorize the sequence of instructions. In FIG. 19, it is shown that a selection is made in the order of "delete", "net" and "path".

There is command stack information 40 for command branching and for interrupt branching. In case of an interrupt command, since there is no command syntax, it is controlled only by a command name. (Refer to FIG. 16I.)

The graphic stack information 42 stacks the designated coordinate data and the address information for the selected graphic component.

Figure 16J:
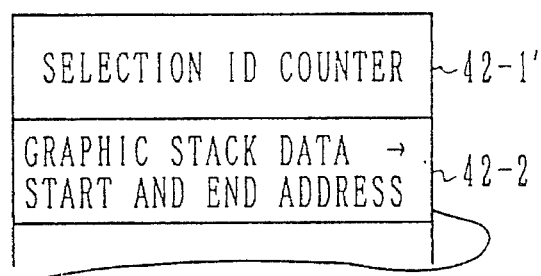
FIG. 16J is a table showing the structure graphic stack information.
Figure 16J:
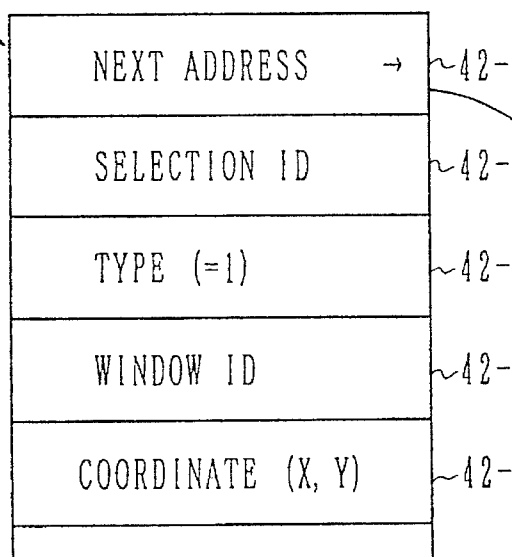
Figure 16J:
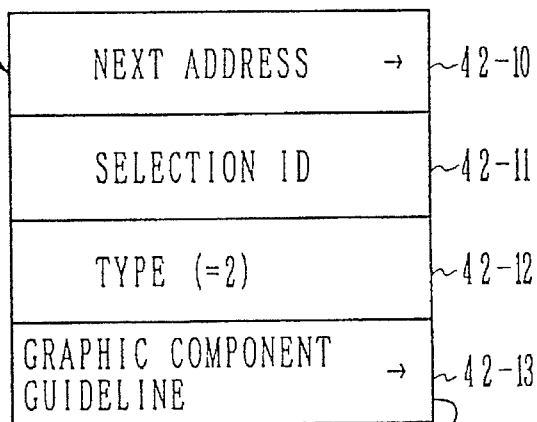

The graphic stack information 42 specifies the final graphic and its graphic data by a selection ID counter 42-1 and a graphic stack data head end address 42-2. The graphic stack data head end address 42-2 is a head end address of a table storing the graphic data. The regions specified by this address store graphic coordinate data 42-3 and selected graphic component 42-4 whose types are specified. The graphic coordinate data 42-3 comprises a next address 42-5, a selection ID 42-6, a type (=1) 42-7, a window ID 42-8 and coordinate values (X, Y) 42-9 that compose a chain. The graphic components 42-4 similarly comprise a next address 42-10, a selection ID 42-11, a type (=2) 42-12 and a graphic component address 42-13. The graphic component address 42-13 specifies the graphic of the graphic data. (Refer to FIG. 16J.)

Figure 16K:
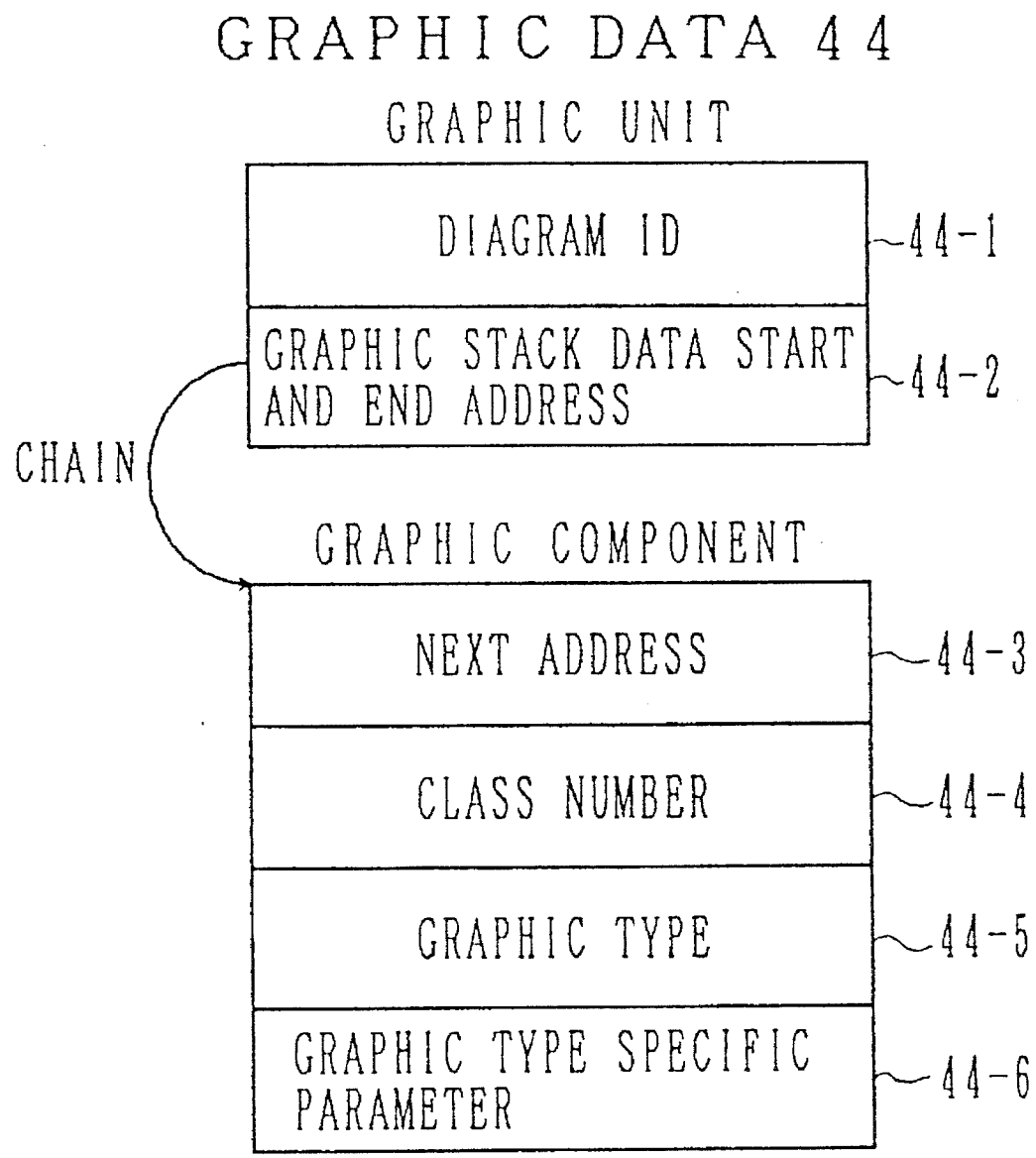
FIG. 16K is a table showing the structure of graphic data.

The graphic data 44 controls the graphic component data for composing the circuit of the edit object. Each graphic component has a "class number" for identifying the "object section" of a command, as well as the coordinate value in correspondence with a line segment, an arch, etc. The graphic data 44 are specified by the graphic component 42-4 of the graphic stack information 42 described earlier and have parameter information classified by the type, such as a character string, a line segment, an arch or a polygon. When a graphic is displayed, for instance, diagram ID 44-1 and graphic data head end address 44-2 sequentially specifies next address 44-3 and composes a chain configuration comprising class number 44-4, graphic type 44-5 and its parameter 44-6. (Refer to FIG. 16K.)

The command syntax definition 41 controls (i) subordinated relations expressing respective categories of "verb", "object" and "complement" for composing the hierarchical concept of command; (ii) the address status of the "immediate pre-selection"; and (iii) the "graphic component class mask" for showing correspondence with the graphic component in the "object" part.

The command syntax definition 41 has a configuration such that the tables representing the verb, the object and the complement are the same. A type 41-1 in FIG. 16L shows the classification of the kind of verb, object and complement. In the embodiment of this invention, types 1, 2 and 3, respectively, indicate the verb, object and complement. Next to the type 41-1, menu item name 41-2 is set. The menu item name 41-2 is a name for each command syntax, for example, "delete" or "move" for a verb, "symbol" or "net" for an object. Next to the menu item name 41-2, the immediately preceding selection 41-3 described earlier is set. Next, a subordinate junior item 41-4 shows the storage head end address of the item belonging to its junior direction. A member number 41-5 shows the number of items. The subordinate junior item 41-4 is an address for displaying the subordinate junior item in cases other than of an immediately prior selection, and enables the item names of the number designated by the member number to be read out from this address. (Refer to FIG. 16L.)

The window status 43 controls (i) the window identifier notified by an input event from the MMI driver 26, (ii) the display object section of its window, (iii) the physical display scope on the screen, (iv) the intra-circuit display scope of the display object, (v) the alignment matrix for menu icons, (vi) the display/non-display status of each window, and (vii) pop-up/permanent stationing modes of the command menus and the like.

Figure 16M:
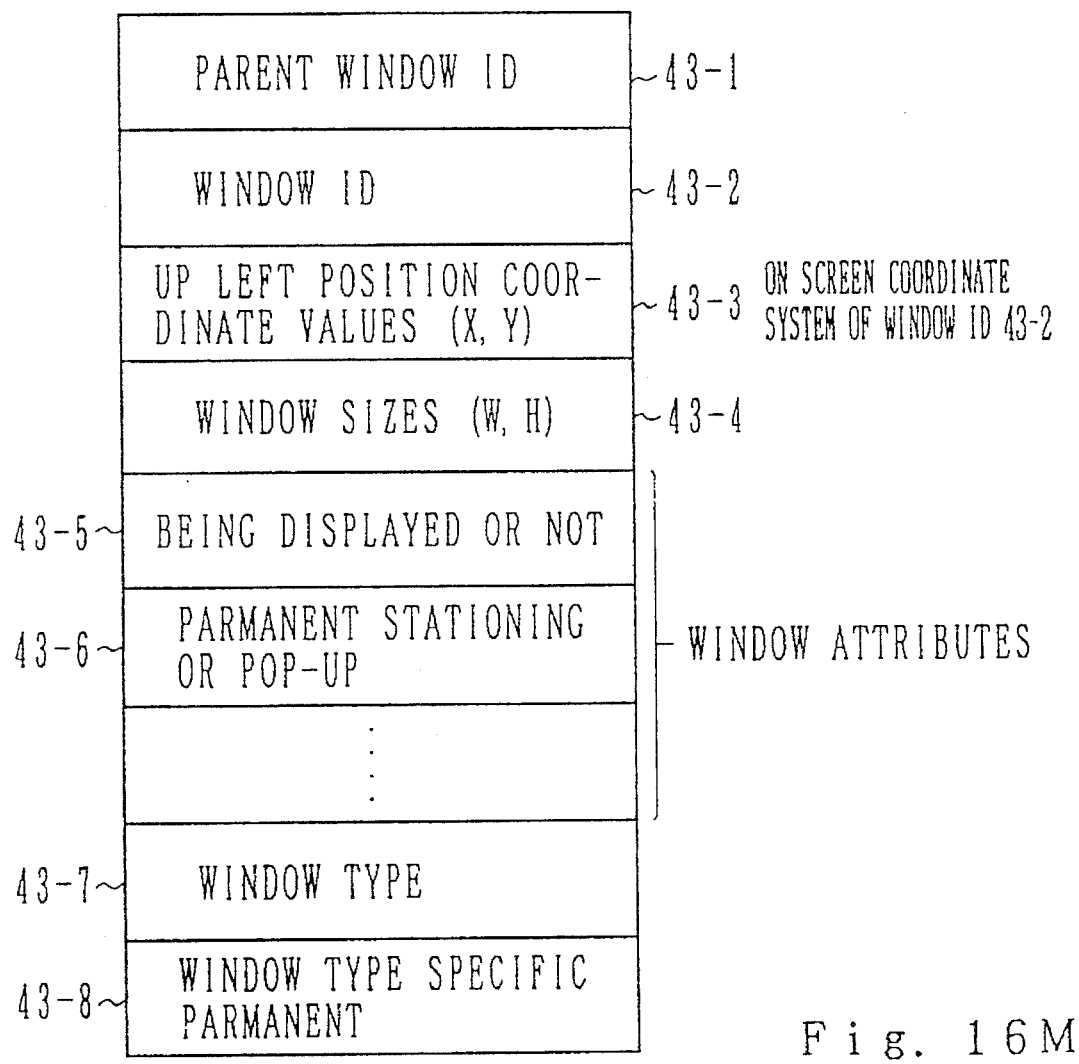
FIG. 16M is a table showing the structure of window status.

As shown in FIG. 16M, the window status 43 shows the status of each window e.g. obtained by dividing the display screen into a plurality of windows. Each window is controlled by a window of the region in which it is displayed, i.e. by a parent window ID 43-1. Therefore, the window status 43 comprises the parent window ID 43-1, a window ID 43-2, up left position coordinate values (X, Y) 43-3 on the screen coordinate system of the window ID 43-2, window sizes (W, H) 43-4, a flag for indicating the existence of a display 43-5, a flag for specifying a permanent stationing or a pop-up 43-6, a window type 43-7 for specifying a window corresponding to the object, and its window type specific parameter 43-8.

Figure 16N:
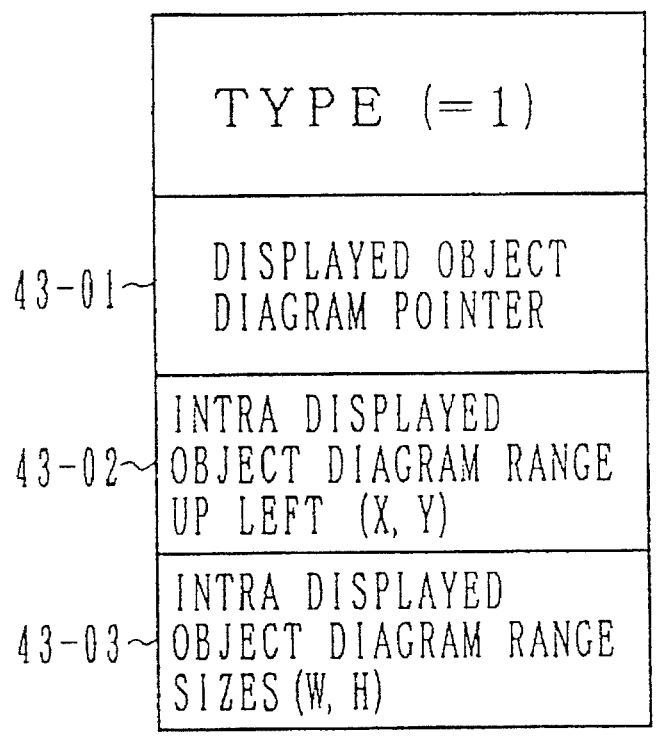
FIG. 16N is a configuration diagram of type 1.
Figure 16O:
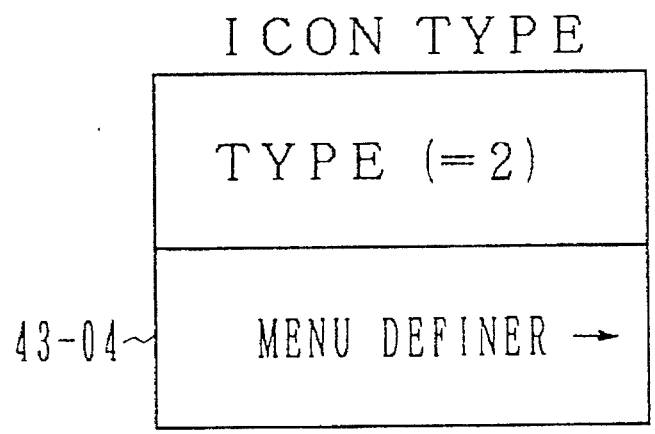
FIG. 16O is a configuration diagram of type 2.
Figure 16P:
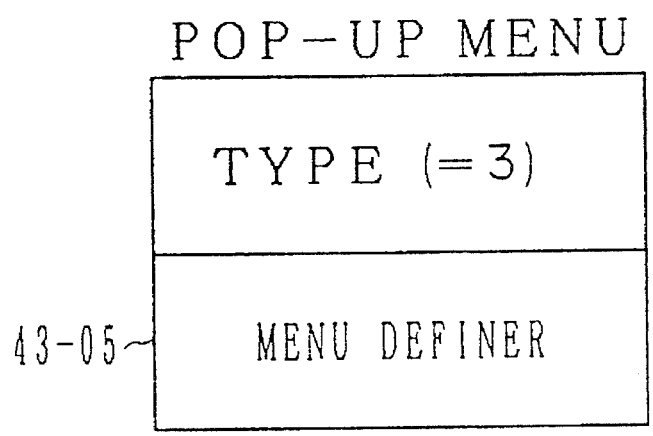
FIG. 16P is a configuration diagram of type 3.
Figure 16Q:
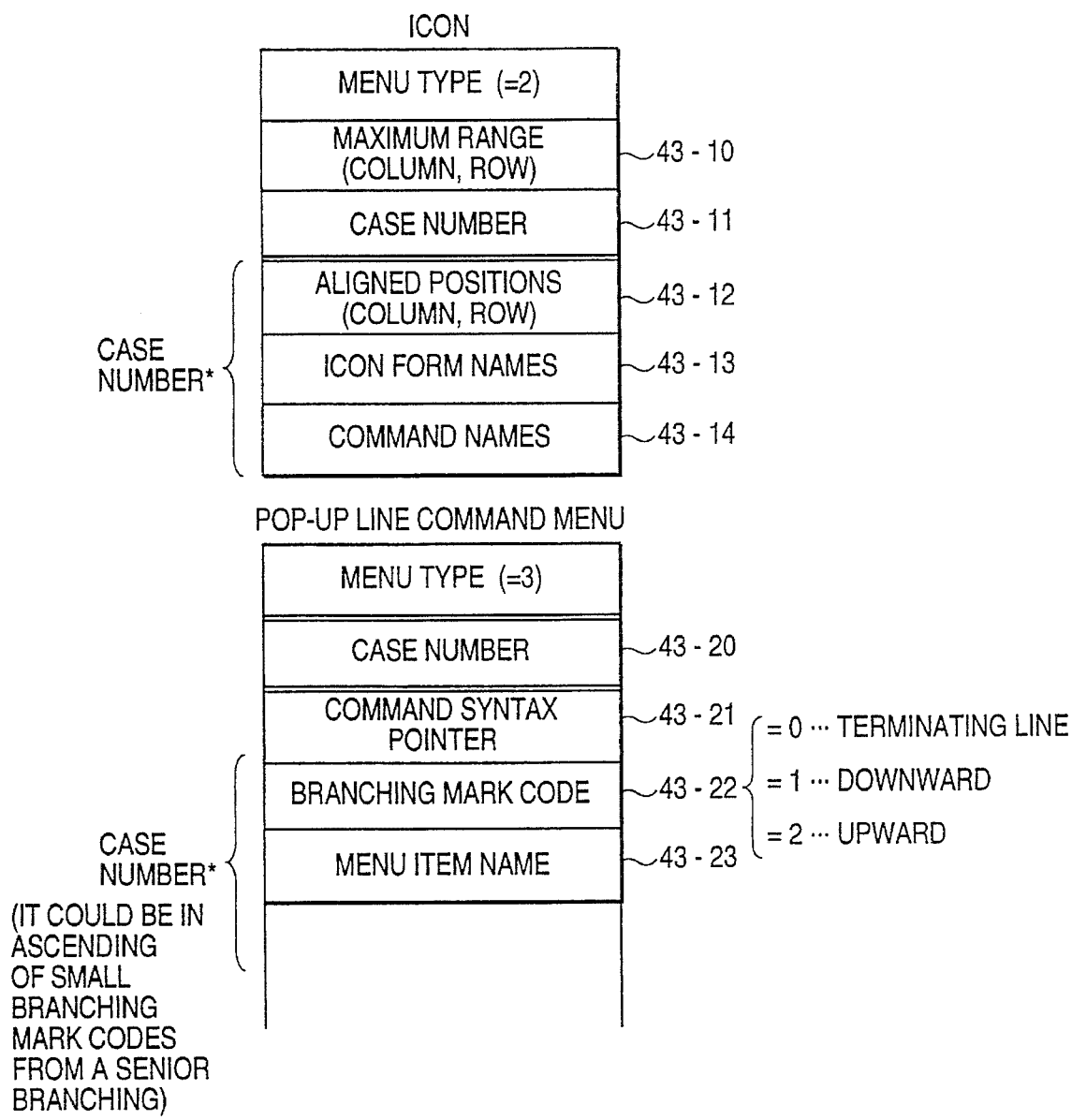
FIG. 16Q is a diagram for explaining icon definers and pop-up line command menu one.

There are three types of window type 43-7. Types 1, 2, and 3 respectively indicate a diagram, an icon, and a pop-up menu, displaying window. In case of type 2 or 3, next to the window type 43-7, window type specific parameter 43-8 such as a menu definer is provided. (Refer to FIGS. 16N through 16P.)

In type 1, a displayed-object-diagram pointer 4301, an intra-displayed-object-diagram range (up left point) 43-02 and an intra-displayed-object-diagram range size 43-03 together show the window type specific parameter 43-8.

Menu definers 43-04 and 43-05 described earlier show an icon and a pop-up menu.

For the icon, the type 2 is similar to the earlier described case, and sets a maximum range (column, row) 43-10 of the menu and its case number 43-11. A pair of icons memorize aligned positions (column, row) 43-12 and icon form names 43-13 and command names 43-14 worth the case number 43-11. A configuration is made such that in correspondence with the icon form names 43-13 an image bit map pre-issues patterns, and this pattern is pulled when the icon form names 43-13 makes a designation.

For the pop-up line command menu, the type is 3 and its pop-up number 43-20 is set. In a unit of each case, a command syntax pointer 43-21, a branching mark code 43-22, and a menu item name 43-23 are memorized. "0", "1" and "2" of the branching mark code respectively indicate a terminating line, a downward direction and an upward direction. The sequence of each case could be in ascending order of small branching mark code from the senior branching.

Numbers 37, 38 and 39 in FIG. 16A indicate command names.

Figure 17:
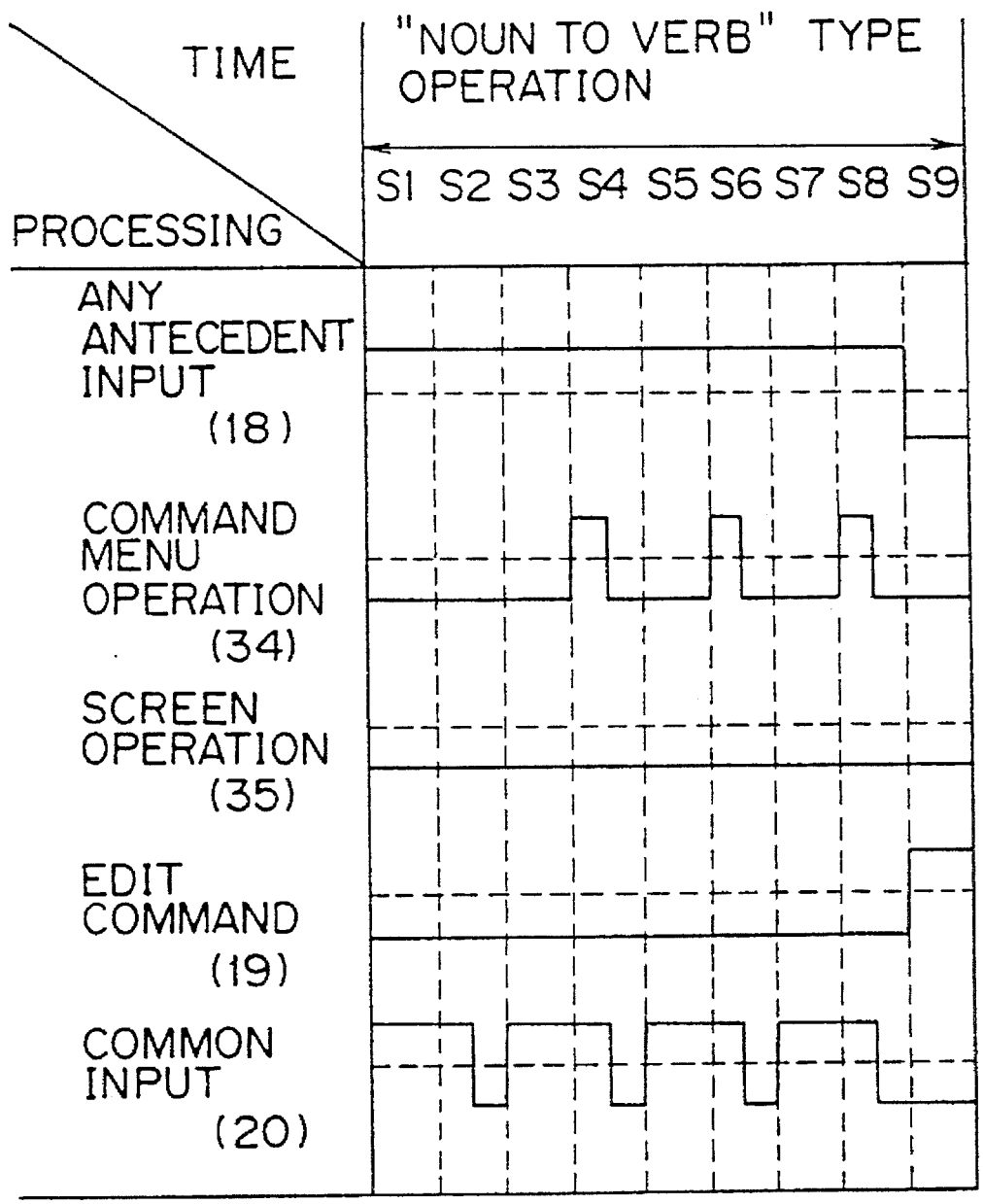
FIG. 17 is a processing time-chart of a "noun to verb" type operation.

FIG. 17 shows a time-chart for the "noun to verb" type operation. Numbers 18, 34, 35, 19 and 20 in FIG. 17 correspond to the same numbers in FIG. 16A. Step 1 through Step 9 in FIG. 17 correspond to the timings at which Step 1 through Step 9, explained in relation to FIG. 4 through FIG. 8, are executed. As is evident by comparing FIG. 4 through FIG. 8, the command menu operation 34 operates in correspondence with Step 4, Step 5 and Step 8. The edit command 19 operates in correspondence with Step 9.

Figure 18:
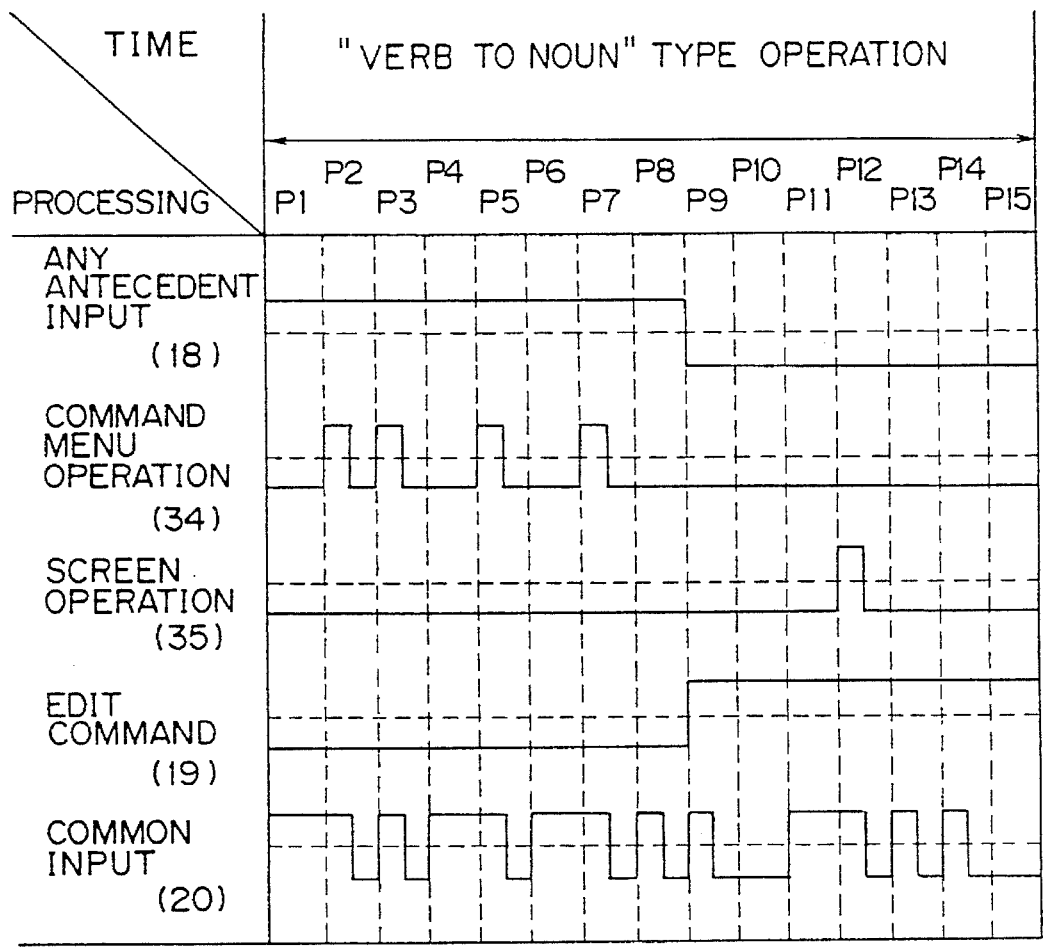
FIG. 18 is a processing time-chart of a "verb to noun" type operation.

FIG. 18 shows the time-chart in case of a "verb to noun" type operation. Numbers 18, 34, 35, 19 and 20 correspond to the same numbers in FIG. 16A. Process 1 through Process 15 in FIG. 18 correspond to the timings at which Process 1 through Process 15 explained in relation to FIG. 9 through FIG. 15 are explained. As is evident by comparing FIG. 9 through FIG. 15, the command menu operation 34 operates in correspondence with Process 2, Process 3, Process 5 and Process 7. The edit command operates and screen operation 35 operates in and after Process 9.

"Any antecedent input" 18 and the "edit command" 19 are mutually exclusive. "Any antecedent input" 18 selects a graphic component that becomes an antecedent in a "noun to verb" type operation, and accepts a trigger for selecting an edit command selection for either a "noun to verb" type operation or a "verb to noun" type operation. "Any antecedent input" 18 does not take out a selected command or stack information of a graphic component. It only activates the processing of the "common input" 20 and stacks a command and graphic information in it. "Any antecedent input" 18 is being activated while the edit command is not finalized. ("Dialog processing monitor" 16 is command stacked.) The "command menu operation" 34 is handled similarly to the "interrupt command" 33 called up from the "common input" 20. That is, the click operation of the second button of the mouse becomes equivalent to the command called the "command menu display" 34. Furthermore, the instruction of the branching arrow in a command menu becomes a "command menu display change".

FIG. 19 shows the operation corresponding to the menu display in case of a "noun to verb" type operation. Numbers 41, 40, 42 and 44 in FIG. 19 correspond to the same numbers in FIG. 16A.

In a status in which a shown definition content is stored in the command syntax definition 41, the verb menu (the primary menu in this case) 3-1 is displayed. When a "delete" is pointed at, the command stack information is notified of this. On the other hand, in this case, since a graphic is already pointed at, the graphic data 44 is clarified based on the content of the graphic stack information 42, the net is described in the content of the command stack information 40, and the complement menu (the tertiary menu in this case) 3-3 is subsequently displayed. Accompanying the path being pointed at, the path is described in the content of the command stack information 40. Meanwhile, in the command syntax definition 41, a chain is extended to a net, a symbol, etc. corresponding to the junior definitions of the "delete".

Figure 20:
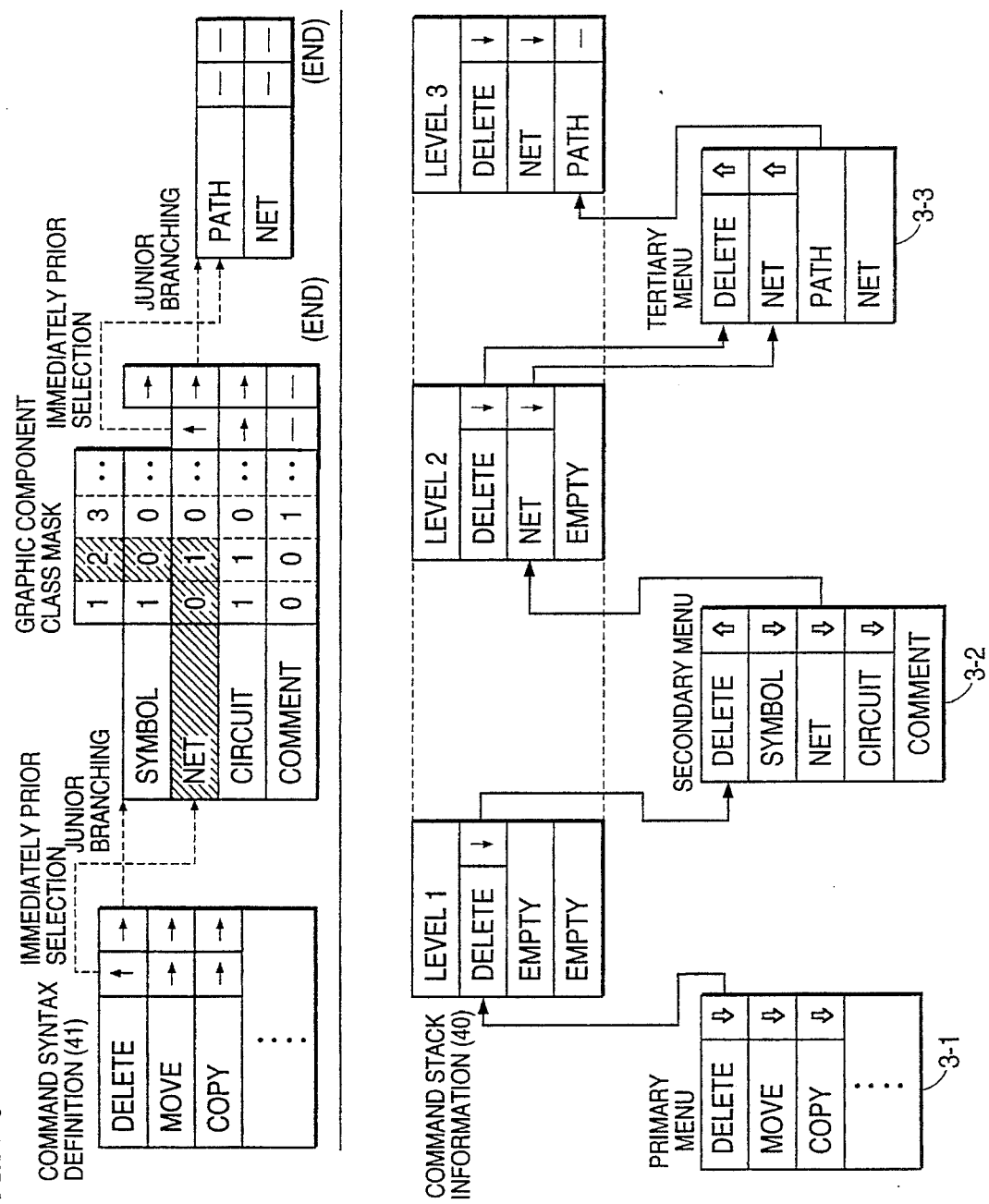
FIG. 20 shows the actions corresponding to a menu displayed in case of a "verb to noun" type operation.

FIG. 20 shows the operation of the menu display in case of a "verb to noun" type operation. Numbers 40 and 41 in FIG. 20 correspond to the same numbers in FIG. 6.

In a status in which a shown definition content is stored in the command syntax definition 41, the verb menu 3-1 (the primary menu in this case) is displayed. When a "delete" is pointed at, the command stack information is notified of this. Then, the object menu 3-2 is displayed. When the net is pointed at, the net is described in the content of the command stack information 40. Next, when the complement menu (the tertiary menu in this case) 3-3 is displayed and the path is pointed at, the command stack information 40 is notified of this. Meanwhile, in the command syntax definition 41, a chain is extended to definitions junior to a "delete", and another chain is extended to definitions junior to a "net".

As explained, this invention improves the space efficiency for the menu display and the operability.

What is claimed is:

1. A method of displaying a hierarchial edit command menu operated in a data processing system for processing data by editing a drawing displayed on a display unit, and executing a selected command, comprising the steps of:

editing said drawing according to a first command operating procedure when at least one element of said drawing displayed on said display unit is selected, and editing said drawing according to a second command operating procedure when said at least one element is not selected;

for each said first and second command operating procedure, preparing a primary command menu having a first hierarchy of at least one primary command name, a secondary command menu having a second hierarchy of at least one secondary command name, said second hierarchy being lower than said first hierarchy, and at least one lower order branch mark corresponding to said at least one secondary command name in said second hierarchy of said secondary command menu and indicating an existence of a third command menu having a third hierarchy of at least one tertiary command name, said third hierarchy being lower than said second hierarchy;

said command menus further including a permanent stationing setting/clearing icon for determining the permanent stationing of said command menus, and when the permanent stationing setting/clearing icon is in a setting state, continuously displaying the selected command on said display unit, and when a plurality of elements in said drawing are successively selected, performing the selected command on the plurality of elements without selecting the selected command repeatedly; and sequentially displaying said prepared primary, secondary and tertiary command menus in an order based on a selected one of said first and second command operating procedures.

2. The method of displaying a hierarchical edit command menu according to claim 1, wherein:

said first command operating procedure is a noun-to-verb operation, and said second command operating procedure is a verb-to-noun operation, the noun indicating an element in said drawing and the verb indicating a process to be performed on said element in said drawing.

3. The method of displaying a hierarchical edit command menu according to claim 1, wherein a hierarchy of said command menu includes:

a verb menu for specifying a verb indicating a type of processing to be performed on an object in said drawing;

an object menu for specifying said object; and a complement menu for specifying a complement.

4. The method of displaying a hierarchical edit command menu according to claim 1, wherein:

said primary, secondary and tertiary command menus each sequentially display a command name for said respective command menu.

5. A method of displaying a hierarchical edit command menu as claimed in claim 1, wherein the drawing is a circuit diagram.

6. A hierarchical edit command menu display apparatus comprising:

a display unit;

storage means for storing a hierarchically-structured menu, including:

a same level command name displaying section for listing at least a part of command names of a same hierarchical level, the command names corresponding to respective commands, a lower branch mark displaying section for displaying a lower branch mark indicating an existence of a command at a level lower than said command of the same hierarchical level, and a higher level command name displaying section for displaying a name of a command included in said commands, at a level higher than that of said commands of the same hierarchical level;

data processing means coupled to the display unit and the storage means, for editing a drawing according to a first command operating procedure if at least one element of said drawing displayed on said display unit is selected, and editing said drawing according to a second command operating procedure if said at least one element is not selected, for displaying said hierarchically-structured menu on the display unit, for displaying a menu listing a command name at a level lower than that of a selected command name if said selected command name has said lower branch mark, and for performing a process on said element in said drawing corresponding to said selected command name when said selected command has no lower branch mark; and said hierarchically-structured menu further includes a permanent stationing setting/clearing icon for determining the permanent stationing of said hierarchically-structured menu, and when the permanent stationing setting/clearing icon is in a setting state, the selected command is continuously displayed on said display unit, and when a plurality of elements in said drawing are successively selected, the selected command is performed on the plurality of elements without selecting the selected command repeatedly.

7. A hierarchical edit command menu display apparatus according to claim 6, wherein said hierarchically-structured menu has a hierarchical structure including a verb menu for specifying a verb indicating a type of processing to be performed on an object;

an object menu for specifying said object; and a complement menu for specifying a complement, the verb, object and complement menus being displayed in a predetermined order.

8. A hierarchical edit command menu displaying apparatus according to claim 7, wherein:

after a command selecting operation is executed in a "verb to noun" type operation, said verb menu, said object menu and said complement menu continue to be displayed in the predetermined order, said noun corresponding to said object.

9. A hierarchical edit command menu according to claim 7, wherein:

when a command selecting operation is executed in a "noun to verb" type operation, said noun corresponding to said object, said objects in the object menu, separately designated on the display unit, are identified;

said complement menu is displayed after said verb menu is displayed by omitting a display of said object menu; and on said complement menu displayed, command names corresponding to said identified objects are described in a senior hierarchy command name displaying part, and the commands corresponding to said processing objects identified are executed.

10. A hierarchical editing command menu display apparatus as claimed in claim 6, wherein the drawing is a circuit diagram.

11. A method of editing a drawing displayed on a display unit, comprising the steps of:

editing said drawing according to a first command operating procedure when at least one element in said drawing displayed on said display unit is selected as an editing object, and editing said drawing according to a second command operating procedure when said element is not selected, said second command Operating procedure being a verb-to-noun operation, said noun indicating an element in said drawing and said verb indicating process to be performed on said drawing;

displaying a command menu comprising commands to edit said drawing;

selecting a command from said menu;

selecting an element in said drawing as an editing object of said selected command;

executing said selected command on said selected element in said drawing: and continuously displaying the selected command in said command menu on said display unit until a predetermined command is received, and when a plurality of elements in said drawing are successively selected, performing the selected command on the plurality of elements without selecting the selected command repeatedly.

12. The method of editing a drawing according to claim 11, wherein:

said first command operating procedure is a noun-to-verb operation, said noun indicating an element in said drawing and said verb indicating a process to be performed on said element in said drawing, said method further comprising the step of editing the drawing according to a command selected from a command menu, the command being performed on the selected element based on said noun-to-verb operation.

13. The method of editing a drawing according to claim 12, wherein:

said command menu includes a plurality of commands only corresponding to said selected element in said drawing as an object based on said noun-to-verb operation.

14. The method of editing a drawing according to claim 12, further comprising the steps of:

displaying said command menu and a complement menu comprising complements corresponding to said selected element in said drawing; and executing a complement selected from said complement menu.

15. The method of editing a drawing according to claim 11, wherein:

each said element in said drawing belongs to a predetermined class of objects, said method further comprises the steps of:

displaying said command menu, an object menu comprising said objects each indicating one of said classes and a complement menu comprising complements corresponding to each of said objects;

selecting one of said objects from said object menu;

selecting an element in said drawing among elements which belong to the class corresponding to the selected object; and executing said selected command on said selected element in said drawing.

16. A method of displaying a hierarchical edit command menu in a data processing system for processing data by editing a drawing, each of plurality of elements of said drawing being displayed on a display unit and corresponding to one of a plurality of object types, and executing a selected command, comprising the steps of:

editing said drawing according to a first command operating procedure when at least one of said plurality of elements of said drawing displayed on said display unit is selected, and editing said drawing according to a second command operating procedure when at least one said plurality of elements of said drawing displayed on said display unit is not selected;

for each said first and second command operating procedure, preparing a primary command menu having a first hierarchy of at least one verb command, said verb command indicating a type of process to be performed on the selected element of said drawing, a secondary command menu having a second hierarchy of at least one object command, said object command specifying said one object type edited by performing a command corresponding to said at least one verb command, said second hierarchy being lower than said hierarchy, said command menus further including a permanent stationing setting/clearing icon for determining the permanent stationing of said command menus, and when the permanent stationing setting/clearing icon is in a setting state, continuously displaying the selected command on said display unit, and when a plurality of elements in said drawing are successively selected, performing the selected command on the plurality of elements without selecting the selected command repeatedly, said first command operating procedure including the steps of:

displaying said primary command menu including said at least one prepared verb command on said display unit only corresponding to the selected element in said drawing;

selecting one of said at least one verb command from said primary command menu; and executing a command corresponding to the selected verb command on the selected element of said drawing; and said second command operating procedure including the steps of:

displaying said primary command menu including said at least one prepared verb command on said display unit;
selecting one of said at least one verb command from said primary command menu;
displaying said secondary command menu including said at least one prepared object command;
selecting one of said at least one object command from said secondary command menu;
selecting an element of said drawing corresponding to the selected object command; and
executing a command corresponding to the selected verb command on the selected element of said drawing.

17. A method of displaying a hierarchical edit command menu according to claim 16, wherein said second command operating procedure further includes the step of:
erasing the other of said at least one verb command not selected from said display unit.

* * * * *

UNITED STATES PATENT AND TRADEMARK OFFICE
CERTIFICATE OF CORRECTION

PATENT NO. : 5,485,175

DATED : January 16, 1996

INVENTOR(S) : Yasuhiro SUZUKI

It is certified that error appears in the above-indentified patent and that said Letters Patent is hereby corrected as shown below:

Title page, item [75], delete "Inagi" insert -- Tokyo--.

Column 1, line 38, after "menu", insert --3B--.

Column 17, line 30, delete "Operating" and insert therefor

--operating--.

Signed and Sealed this

Fourteenth Day of May, 1996

Attest:

BRUCE LEHMAN

*Attesting Officer*          *Commissioner of Patents and Trademarks*